(12) United States Patent
Park et al.

(10) Patent No.: US 10,818,075 B2
(45) Date of Patent: Oct. 27, 2020

(54) CONTENT OUTPUT METHOD AND ELECTRONIC DEVICE FOR SUPPORTING SAME

(71) Applicant: Samsung Electronics Co., Ltd., Gyeonggi-do (KR)

(72) Inventors: Eun Sol Park, Gyeonggi-do (KR); Young Ri Kim, Gyeonggi-do (KR); Oh Yoon Kwon, Seoul (KR); Kyung Tae Kim, Gyeonggi-do (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 0 days.

(21) Appl. No.: 16/337,987

(22) PCT Filed: Oct. 11, 2017

(86) PCT No.: PCT/KR2017/011163
§ 371 (c)(1),
(2) Date: Mar. 29, 2019

(87) PCT Pub. No.: WO2018/070766
PCT Pub. Date: Apr. 19, 2018

(65) Prior Publication Data
US 2019/0213781 A1 Jul. 11, 2019

(30) Foreign Application Priority Data
Oct. 13, 2016 (KR) .................. 10-2016-0133031

(51) Int. Cl.
*G06T 15/10* (2011.01)
*G06T 19/00* (2011.01)
(Continued)

(52) U.S. Cl.
CPC .............. *G06T 15/10* (2013.01); *G06F 3/011* (2013.01); *G06T 19/003* (2013.01);
(Continued)

(58) Field of Classification Search
None
See application file for complete search history.

(56) References Cited

U.S. PATENT DOCUMENTS 8,553,029 B2 10/2013 Kim et al.
9,124,882 B2 9/2015 Bernard et al.
(Continued)

FOREIGN PATENT DOCUMENTS

KR 10-2010-0021905 A 2/2010
KR 10-2012-0082622 A 7/2012
(Continued)

*Primary Examiner* — Michelle Chin
(74) *Attorney, Agent, or Firm* — Cha & Reiter, LLC

(57) ABSTRACT

An electronic device includes a housing, a memory storing at least a piece of content and at least one application associated with an output of the content, a display exposed through one region of the housing and displaying the content, and a processor electrically connected to the memory and the display. The processor is configured to determine an attribute of at least part of the content, based on whether at least one specified condition is satisfied with respect to content selected by an input and, when it is determined that the attribute is associated with virtual reality (VR) content, to output the selected content based on execution of an application associated with an output of the VR content.

13 Claims, 15 Drawing Sheets

(51) Int. Cl.
  *G06F 3/01* (2006.01)
  *H04N 21/81* (2011.01)
  *H04N 21/443* (2011.01)
  *H04N 21/435* (2011.01)
  *H04N 21/44* (2011.01)

(52) U.S. Cl.
  CPC ........... *H04N 21/435* (2013.01); *H04N 21/44* (2013.01); *H04N 21/443* (2013.01); *H04N 21/81* (2013.01); *G06T 2200/04* (2013.01)

(56) References Cited

U.S. PATENT DOCUMENTS

| | | |
|---|---|---|
| 9,787,977 B2 | 10/2017 | Bernard et al. |
| 9,918,082 B2 | 3/2018 | Grange et al. |
| 2010/0039428 A1 | 2/2010 | Kim et al. |
| 2012/0330636 A1* | 12/2012 | Albou .................... G16B 15/00 703/12 |
| 2013/0194401 A1 | 8/2013 | Bernard et al. |
| 2014/0267228 A1 | 9/2014 | Ofek et al. |
| 2015/0341625 A1 | 11/2015 | Bernard et al. |
| 2016/0112704 A1 | 4/2016 | Grange et al. |
| 2017/0206708 A1 | 7/2017 | Gentilin et al. |
| 2018/0199065 A1 | 7/2018 | Adams et al. |

FOREIGN PATENT DOCUMENTS

| | | |
|---|---|---|
| KR | 10-2013-0088722 A | 8/2013 |
| KR | 10-2016-0108158 A | 9/2016 |

\* cited by examiner

CONTENT OUTPUT METHOD AND ELECTRONIC DEVICE FOR SUPPORTING SAME

CLAIM OF PRIORITY

This application is a National Phase Entry of PCT International Application No. PCT/KR2017/011163, which was filed on Oct. 11, 2017 and claims a priority to Korean Patent Application No. 10-2016-0133031, which was filed on Oct. 13, 2016, the contents of which are incorporated herein by reference.

TECHNICAL FIELD

Various embodiments disclosed in the disclosure relate to a technology for outputting content based on content attribute.

BACKGROUND ART

As the smartphone market has matured, a wearable electronic device (i.e., called a wearable device), which supports various functions while operating in conjunction with the smartphone has been proposed. The wearable device may support organic fusion between human and technology in various fields. For example, a wearable device, such as a head mounted display (HMD), smart glasses, or the like provides stereoscopic content such as virtual reality (VR) or augmented reality (AR) on a user's view and satisfies the demand of the user's various experiences.

DISCLOSURE

Technical Problem

On a wearable device or an electronic device operating in conjunction with the wearable device, user control may be required in connection with the selection of the output mode (e.g., 2D mode, 3D mode, 360-degree mode, or the like) according to the attribute (e.g., 2D content, 3D content, 360-degree content, or the like) of the content. In this case, due to the user control or the processing of the user control, the immersion of the content viewing may be inhibited or the disconnection of the user's experience may be caused.

Various embodiments disclosed in the disclosure may provide a content output method capable of easily operating a VR system or minimizing the restriction of content viewing, by supporting a content output optimized for the attribute of content, and an electronic device supporting the same.

Technical Solution

According to various embodiments described above, an electronic device may include a housing, a memory storing at least a piece of content and at least one application associated with an output of the content, a display exposed through one region of the housing and displaying the content, and a processor electrically connected to the memory and the display.

According to various embodiments, the processor may be configured to determine an attribute of at least part of the content, based on whether at least one specified condition is satisfied with respect to content selected by an input and to output the selected content based on execution of an application associated with an output of the VR content when it is determined that the attribute is associated with VR content.

Advantageous Effects

According to various embodiments, the easy operation of a VR system may be supported by excluding a user's output control according to content attribute.

According to various embodiments, the immersion of content viewing may be improved through the optimization of the VR system.

Besides, a variety of effects directly or indirectly understood through this disclosure may be provided.

MODE FOR INVENTION

Figure 1:
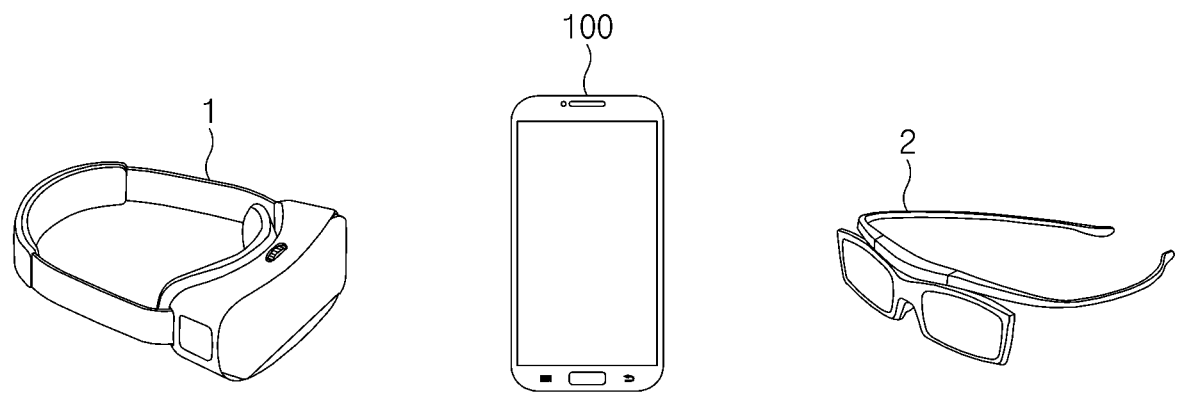
FIG. 1 is a view schematically illustrating an operating environment of an electronic device, according to an embodiment.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the disclosure may not be limited to the above-described electronic devices and may include other electronic devices and new electronic devices according to the development of technologies.

Hereinafter, electronic devices according to various embodiments will be described with reference to the accompanying drawings. In the disclosure, the term "user" may refer to a person who uses an electronic device or may refer to a device (e.g., an artificial intelligence electronic device) that uses the electronic device.

FIG. 1 is a view schematically illustrating an operating environment of an electronic device, according to an embodiment.

Referring to FIG. 1, an electronic device 100 according to an embodiment may interact with various external devices with regard to the operation of a VR system. In this regard, the electronic device 100 may establish a network with external device such as a head mounted display (HMD) 1, smart glasses 2, or the like. The electronic device 100 may transmit or receive content data to or from the external device, by performing wired communication or wireless communication to access the network.

In an embodiment, the electronic device 100 may be mounted in the HMD device 1 so as to be operated. For example, the electronic device 100 may be mounted and removed in and from the front region of the HMD device 1, based on a coupling member (e.g., a hook, a band, a screw, or the like) provided in the HMD device 1. Alternatively, the electronic device 100 may be included in the HMD device 1, or may be operated physically integrated with the HMD device 1. The VR content (e.g., video or image) displayed in the display region of the electronic device 100 may be displayed on the view of the user wearing the HMD device 1, via a lens assembly mounted on the HMD device 1. In viewing the VR content based on the HMD device 1, the view change of VR content may correspond to the movement of the body (e.g., head) of the user of the HMD device 1.

In an embodiment, the electronic device 100 may be operatively paired with the smart glasses 2. VR content including a three Dimension (3D) attribute may be displayed in the display region of the electronic device 100. In this case, the electronic device 100 may alternately display the VR content of the 3D attribute in the form of left-eye content and right-eye content corresponding to the user's eyes. With regard to the implementation of binocular parallax, the electronic device 100 may transmit a synchronization signal or control signal to the smart glasses 2 such that the shutter mounted on the smart glasses 2 is selectively opened and closed in compliance with the left-eye content and the right-eye content.

In various embodiments, the external device may not be limited to the HMD device 1 or the smart glasses 2 described above, and may include a variety of platforms capable of establishing or supporting a VR system through interaction with the electronic device 100.

Figure 2:
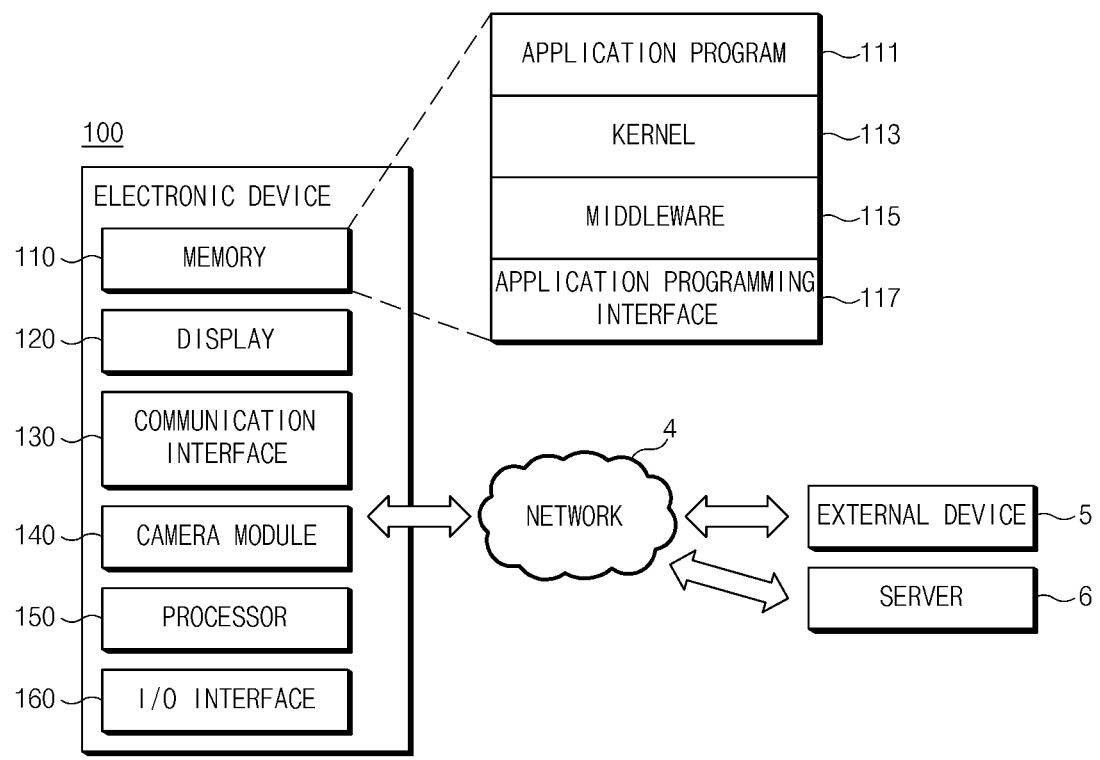
FIG. 2 is a view illustrating a configuration of an electronic device according to an embodiment.

FIG. 2 is a view illustrating a configuration of an electronic device according to an embodiment.

Referring to FIG. 2, the electronic device 100 may be connected by establishing a network 4 with an external device 5 or a server 6, electrically or in a communication. The external device 5 may include at least one of the HMD device 1 or the smart glasses 2 described above through FIG. 1. For example, the server 6 may support downloading or streaming at least a piece of content to the electronic device 100.

In an embodiment, the electronic device 100 may include a memory 110, a display 120, a communication interface 130, a camera module 140, a processor 150, and an I/O interface 160. In some embodiments, the electronic device 100 may omit at least one of the above-described components or may further include another component.

The memory 110 may store at least a piece of content displayed on the display 120. For example, the memory 110 may store content (e.g., video or image) downloaded or streamed from a separate external device (or a server), or captured by the camera module 140. The memory 110 may include at least one program. The program may include an application program 111, a kernel 113, a middleware 115, or an application programming interface (API) 117. At least a part of the kernel 113, the middleware 115, or the API 117 may be called an "operating system (OS)".

For example, the application program 111 (or the graphic user interface according to the execution of the application program 111) may include at least a piece of content. Alternatively, the application program 111 may include at least one player based on the attribute of the content (or corresponding to the attribute of content). In various embodiments, the memory 110 may include one or more application programs 111.

The kernel 113 may control or manage system resources (e.g., the memory 110, the processor 150, and the like) that are used to execute operations or functions implemented in other programs (e.g., the application program 111, the middleware 115, the API 117). The kernel 113 may provide an interface that allows the application program 111, the middleware 115, or the API 117 to access each component of the electronic device 100 so as to control or manage system resources.

The middleware 115 may perform, for example, a mediation role such that the application program 111 or the API 117 can communicate with the kernel 113 to transmit or receive data. Furthermore, the middleware 115 may process at least one task request received from the application program 111 according to a priority. For example, the middleware 115 may assign the priority, which makes it possible to use a system resource (e.g., the memory 150, the processor 110, or the like) of the electronic device 100, to at least one of the application program 111. The middleware 115 may perform scheduling, load balancing, or the like on the at least one task request based on the priority.

The API 117 may be an interface through which the application program 111 controls a function provided by the kernel 113 or the middleware 115, and may include, for example, at least one interface or function (e.g., an instruction) for a file control, a window control, image processing, a character control, or the like.

In various embodiments, the memory 110 may include at least one of a volatile memory (e.g., a dynamic random access memory (DRAM), a static RAM (SRAM), or a synchronous DRAM (SDRAM)), or a nonvolatile memory (e.g., a one-time programmable read only memory (OTPROM), a programmable ROM (PROM), an erasable and programmable ROM (EPROM), an electrically erasable and programmable ROM (EEPROM)), a mask ROM, a flash ROM, a flash memory or the like.

The display 120 may output or display various content (e.g., texts, images, video, icons, symbols, or the like). For example, the display 120 may display at least a piece of content stored in the memory 110, under the control of the processor 150. Alternatively, the display 120 may display at least a piece of content streamed from the server 6, in real time.

In various embodiments, the display 120 may include, for example, a liquid crystal display (LCD), a light-emitting diode (LED) display, an organic LED (OLED) display, a microelectromechanical systems (MEMS) display, or an electronic paper display. Furthermore, the display 120 may include a touchscreen display, and may receive, for example, a touch, a gesture, proximity, or a hovering input using an electronic pen or a part (e.g., a finger) of the user's body, based on the touchscreen display.

The communication interface 130 may establish communication between the electronic device 100 and the external device 5 or the server 6. For example, the electronic device 100 may perform wireless communication or wired communication with the external device 5 or the server 6, by accessing the network 4 based on the communication interface 130. The network 4 may include at least one of a computer network (e.g., local area network (LAN) or wide area network (WAN)), Internet, or a telephone network.

In various embodiments, the wireless communication may include at least one of long term evolution (LTE), LTE-advanced (LTE-A), code division multiple access (CDMA), wideband CDMA (WCDMA), universal mobile telecommunications system (UNITS), wireless broadband (WiBro), or global system for mobile communications (GSM), as a cellular communication protocol. Moreover, wireless communication may include short range communication such as Wireless Fidelity (Wi-Fi), Bluetooth, Near Field Communication (NFC), magnetic stripe transmission (MST), or the like.

In various embodiments, the electronic device 100 may generate content itself, in addition to the content downloaded or streamed from a separate external device (or server). To this end, the electronic device 100 may include the at least one camera module 140. The at least one camera module 140 may be disposed in the electronic device 100 to capture images (e.g., a still image or video) of different directions or regions. For example, the at least one camera module 140 may be disposed on the electronic device 100 to capture a region divided at each interval of 120 degrees. Alternatively, the at least one camera module 140 may be disposed at opposite locations on the electronic device 100 to capture the front view and rear view of the electronic device 100. The at least one camera module 140 may be fixed at a specified point in the electronic device 100 or may be at least partially moved such that the capture direction (or capture region) is changed in response to user control. In various embodiments, for example, under the edit (e.g., stitching) of the processor 150, the image captured by the at least one camera module 140 may be implemented as VR content and may be stored in the memory 110.

The processor 150 may be electrically or operatively connected to at least another component of the electronic device 100 to perform control, communication operations, or data processing on the component. For example, the processor 150 may analyze data of content activated (or output is commanded) in response to the user control or specified scheduling information. For example, when the activated content is streamed from the external device 5 or the server 6, the processor 150 may analyze tag information or URL information about the content. Alternatively, when the activated content is stored in the memory 110, the processor 150 may analyze stored file name information. In an embodiment, when there is no data of the activated content or when explicit information is not included, the processor 150 may determine whether the specified at least one condition is satisfied, as the part of the data analysis of the content. This will be described with reference to FIGS. 3A to 10 described later.

In an embodiment, the processor 150 may determine the attribute of the activated content, based on the result of the data analysis or the determination result of whether the condition is satisfied. For example, when the attribute of the content is matched to at least one of 2D, 3D, Side By Side (SBS), 3D Top and Bottom (TB), or 360 degrees, the processor 150 may determine the activated content as VR content. The processor 150 may separately manage the VR content among the at least a piece of content that is stored in the electronic device 100 or streamed from the external device 5 or the server 6, by establishing information about the determined VR content as a database to store the information in the memory 110.

In an embodiment, when it is determined that the activated content is the VR content, the processor 150 may identify a player matched to the attribute (e.g., 2D, 3D SBS, 3D TB or 360 degrees) of the VR content. The processor 150 may control the execution of a specific application program 111 (or an output mode (a mode in which a player matched to the attribute of VR content is executed)) including the identified player among the at least one application program 111 stored in the memory 110. For example, when it is determined that the VR content is a 3D attribute, the processor 150 may execute an application program (or output mode) including a 3D player to allow the application program to process the output of the VR content.

The I/O interface 160 may transmit instructions or data, which is input from a user or another external device, to another component of the electronic device 100. Alternatively, the I/O interface 160 may output instructions or data, which is received from another component of the electronic device 100, to the user or another external device.

Hereinafter, various embodiments that determine the attribute of content based on whether at least one specified condition of the activated content is satisfied and control an output based on the determined content attribute will be described with regard to the case where it is not determined that the attribute of the content, through analyzing the data (e.g., tag information, URL information, file name information, or the like) of the activated content (or the output of content is commanded) or the case where the determined attribute is checked again.

Figure 3A:
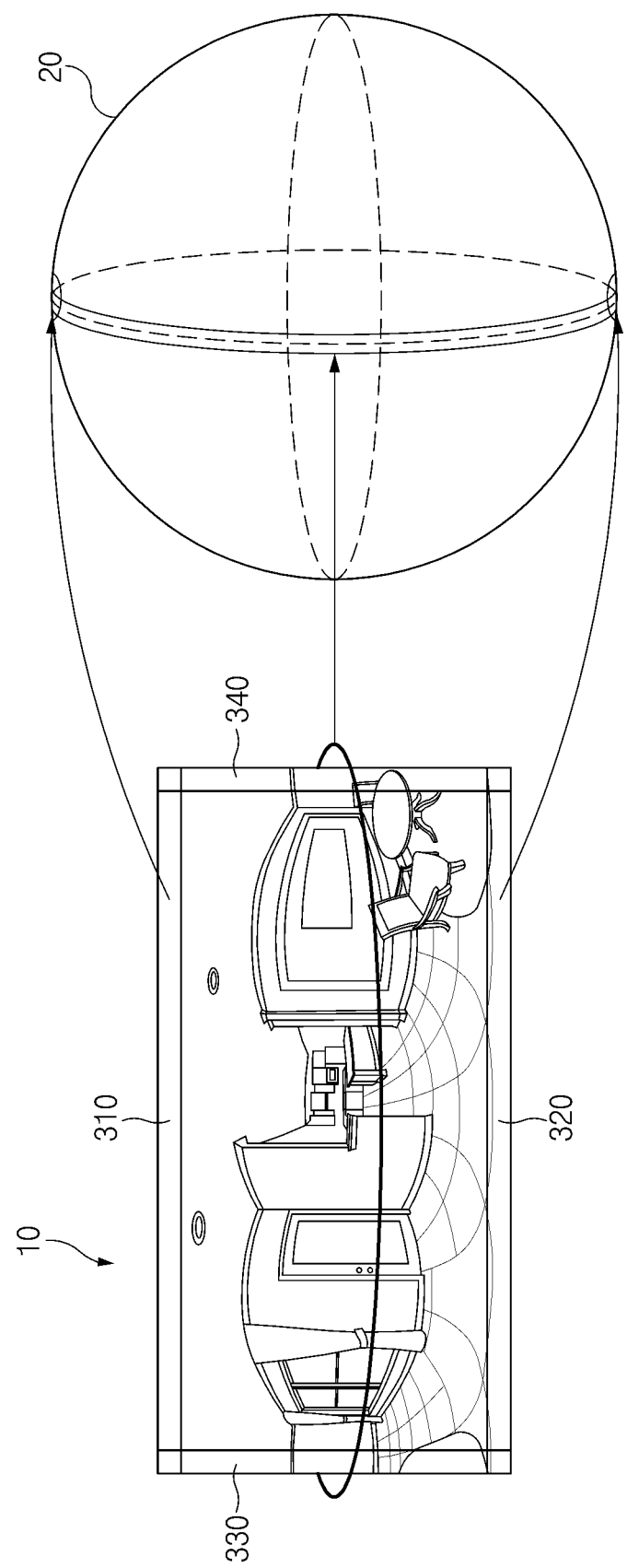
FIG. 3A is a view illustrating a form of content attribute determination, according to the first embodiment.
Figure 3B:
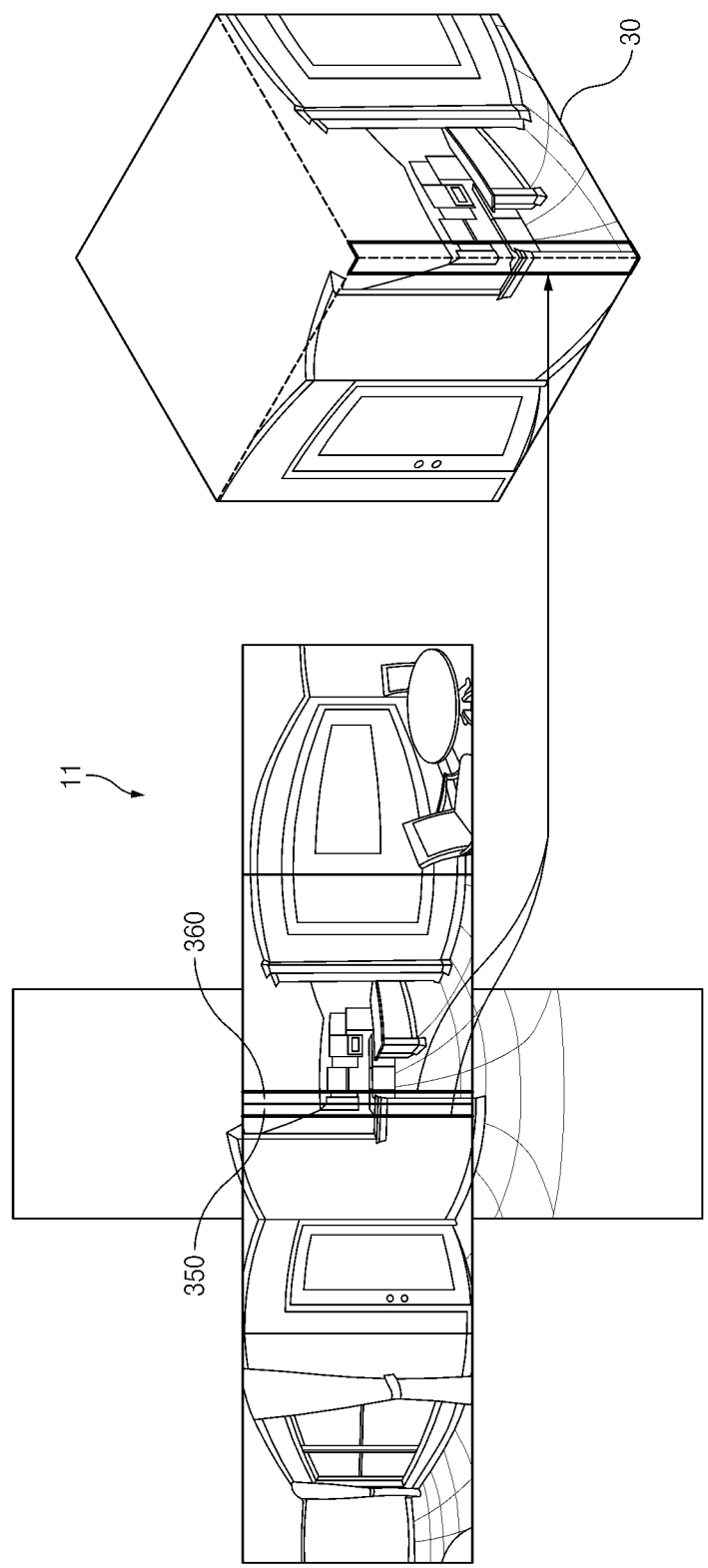
FIG. 3B is a view illustrating another form of content attribute determination, according to the first embodiment.
Figure 3C:
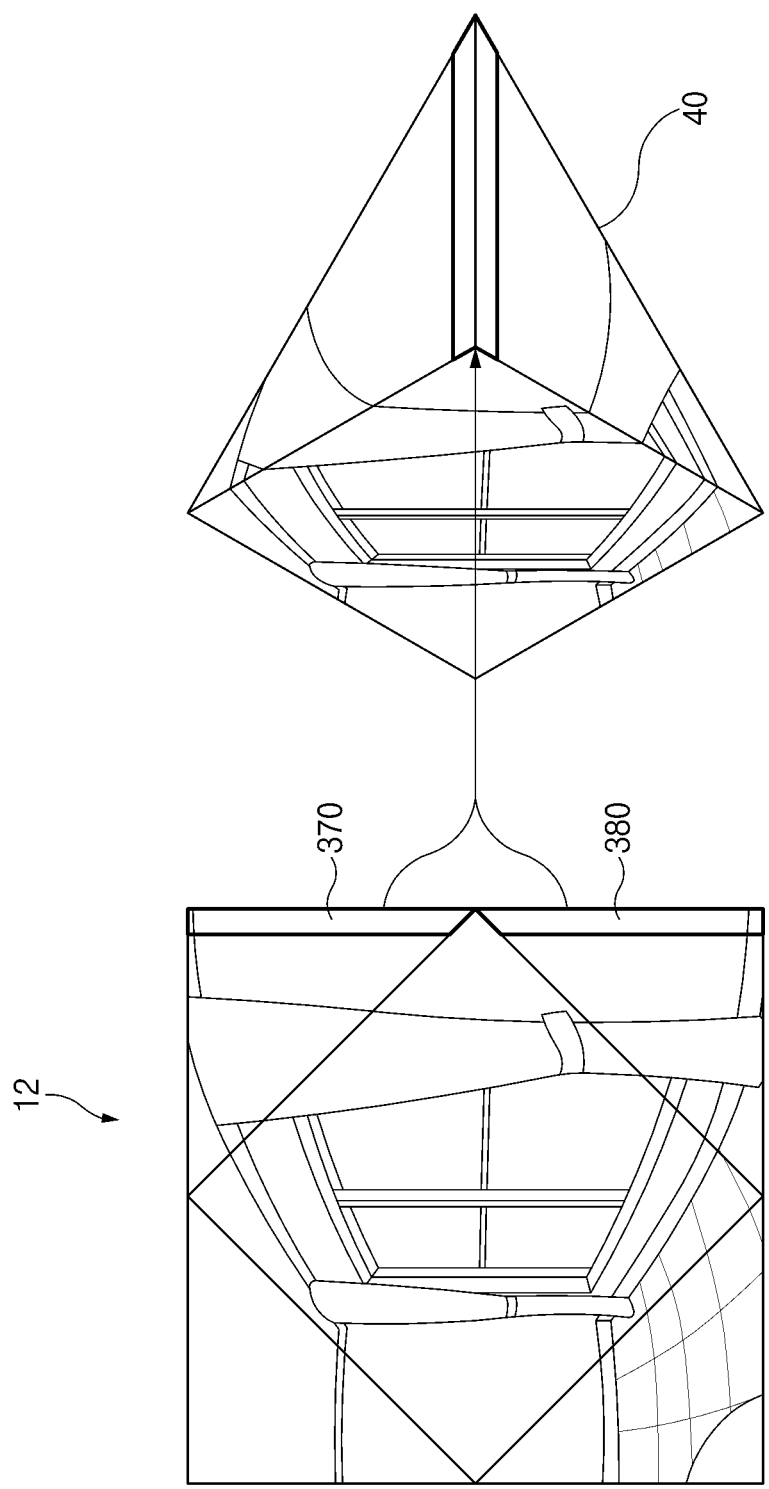
FIG. 3C is a view illustrating still another form of content attribute determination, according to the first embodiment.

FIGS. 3A, 3B, and 3C are views illustrating various forms of content attribute determination, according to the first embodiment.

In an embodiment, a processor (150 of FIG. 2) of an electronic device (100 of FIG. 2) may extract a main frame by analyzing at least one respective frame of the activated content (or the output of content is commanded). For example, the processor 150 may detect an object for each frame that constitutes content, based on image processing such as an edge detection filter, an active contours model, or the like. In this operation, the processor 150 may assign one frame, in which the relatively large number of objects having a specified size or more is detected, from among the at least one frame as the main frame.

Referring to FIG. 3A, the processor 150 may analyze pixel information about first to fourth regions 310, 320, 330, and 340 on a main frame 10 of the activated content (or the output of content is commanded). For example, the processor 150 may analyze a color value (e.g., an RGBA value) of each of a plurality of pixels included in the first region 310. The processor 150 may compare color values of the plurality of pixels included in the first region 310 to determine whether the coincidence of a specified ratio or more is present. The processor 150 may analyze pixel information with respect to the second region 320 in the manner the same as or similar to the above-described manner of the first region 310. In the case of the third region 330 and the fourth region 340, the processor 150 may determine whether the color values of the corresponding pixels in the same Y-axis coordinate (or the same height) between the regions 330 and 340 are the same as each other by the specified ratio or more.

In an embodiment, the processor 150 may determine whether to correspond to the VR content having 360-degree attribute, by performing the pixel information analysis (or, color value analysis) on the activated content. In this regard, when it is assumed that the attribute of content including the main frame 10 is 360 degrees, the main frame 10 may be mapped to, for example, a three-dimensional spherical object 20. In this case, the first region 310 and the second region 320 of the main frame 10 may correspond to the upper pole region and the lower pole region of the spherical object 20, respectively. Furthermore, the third region 330 and the fourth region 340 of the main frame 10 may be in contact with each other in any spherical surface region of the spherical object 20. As such, when the color values of a plurality of pixels included in the first region 310 are the same as the color values of a plurality of pixels included in the second region 320 by the specified ratio or more and when the color values of the corresponding pixels in the same Y-axis coordinate (or the same height) between the third region 330 and the fourth region 340 are the same as each other by the specified ratio or more, the processor 150 may determine that the content including the main frame 10 is the VR content of 360-degree attribute.

In various embodiments, the VR content of 360-degree attribute may be mapped to various polyhedral objects as well as the spherical object 20. For example, referring to FIG. 3B, a main frame 11 of the content may be mapped to a cube object 30. In this case, a first region 350 and a second region 360 on the main frame 11 may be in contact with each other or adjacent to each other in any corner region of the mapped cube object 30. When the matching ratio between the color values of the corresponding pixels in the same Y-axis coordinate (or the same height) between the first region 350 and the second region 360 is not less than the specified ratio, the processor 150 may determine that the content including the main frame 11 is the VR content of 360-degree attribute.

Referring to FIG. 3C, a main frame 12 of the content may be mapped to a triangular pyramid object 40. The processor 150 may analyze pixel information about a first region 370 and a second region 380 of the main frame 12, which are in contact with each other or adjacent to each other in any corner region of the triangular pyramid object 40. When the matching ratio between the color values of pixels corresponding (or in contact with or adjacent to each other) between the first region 370 and second region 380 is not less than a specified ratio, the processor 150 may determine that the content including the main frame 12 is the VR content of 360-degree attribute. In various embodiments, the object to which the VR content is capable of being mapped may not be limited to the above-described spherical object 20, the above-described cube object 30, or the above-described triangular pyramid object 40. In addition, objects of various shapes may be applied. Hereinafter, an embodiment in which the VR content of 360-degree attribute is mapped to the spherical object 20 will be described as an example.

Figure 4:
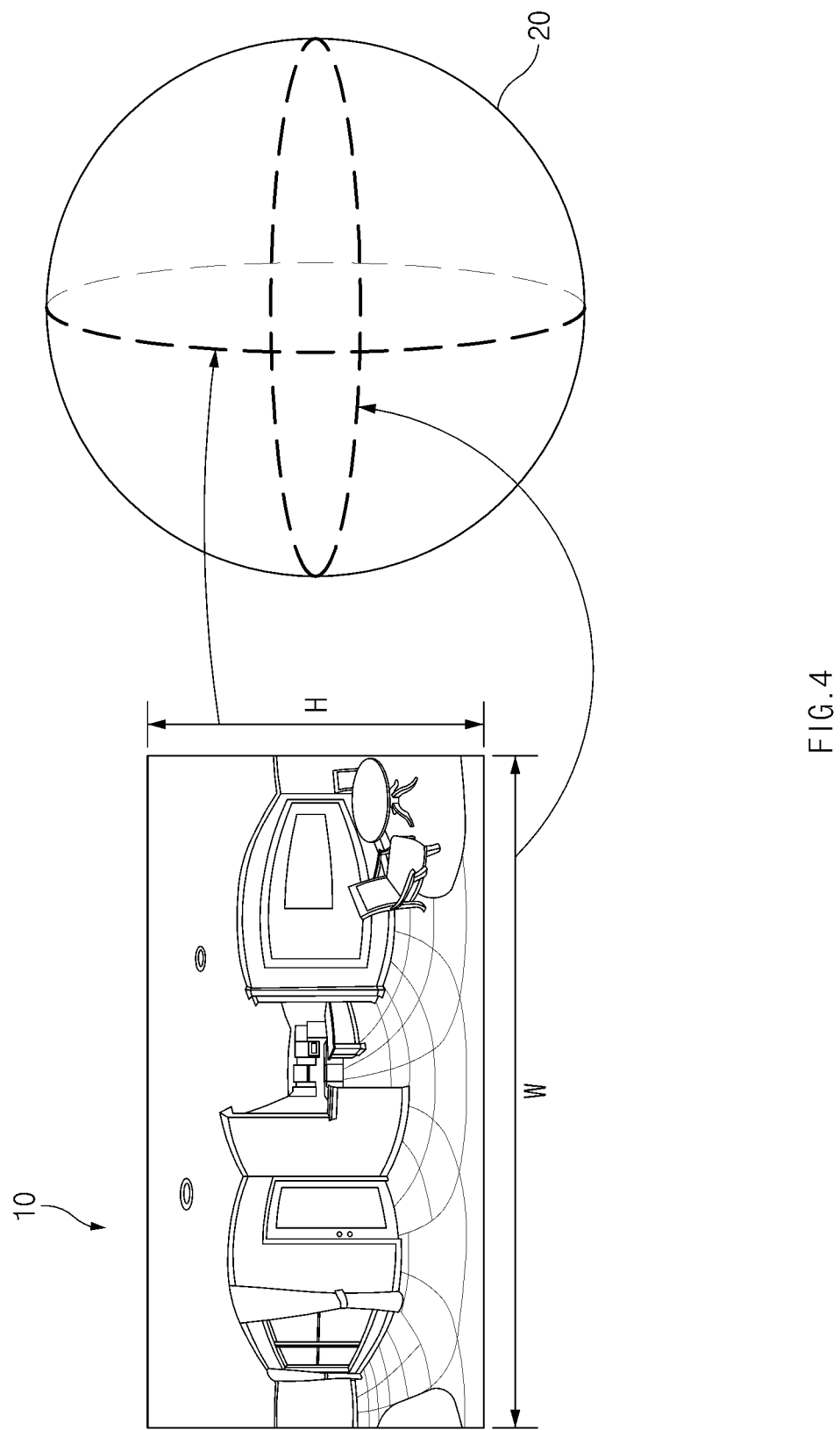
FIG. 4 is a view illustrating a form of content attribute determination, according to the second embodiment.

FIG. 4 is a view illustrating a form of content attribute determination, according to the second embodiment.

Referring to FIG. 4, the main frame 10 of the activated content (or the output of content is commanded) may include an arbitrary length ratio between the horizontal direction 'w' and the vertical direction 'h'. Referring to FIGS. 3A and 4, the VR content of 360-degree attribute may be mapped to the spherical object 20. At this time, because the upper-end region (e.g., the first region 310 of FIG. 3A) and the lower-end region (e.g., the second region 320 of FIG. 3A) of the 360-degree VR content respectively correspond to the upper pole region and the lower pole region of the spherical object 20, the width of horizontal direction 'w' of the 360-degree VR content may be mapped to surround the spherical object 20. As such, in an embodiment, the length of horizontal direction 'w' of the main frame 10 may correspond to the circumference length of the spherical object 20; the length of vertical direction 'h' may correspond to half the circumference length of the spherical object 20.

In an embodiment, as described above, when the length ratio between the horizontal direction 'w' and vertical direction 'h' of the main frame 10 is equal to the specified ratio (e.g., 2:1) or is included in a specified ratio range, the processor (150 of FIG. 2) of the electronic device (100 of FIG. 2) may determine that the content including the main frame 10 is the VR content of 360-degree attribute.

Figure 5:
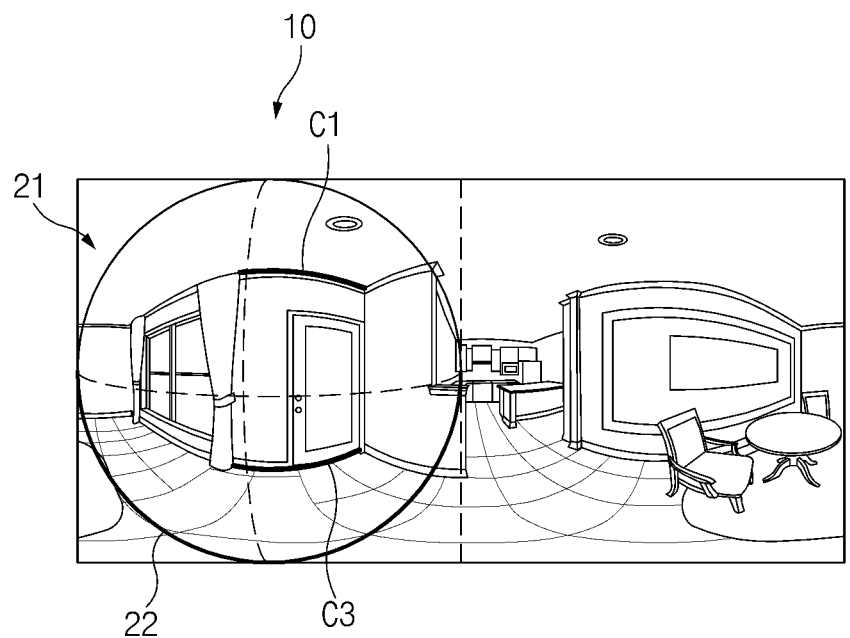
FIG. 5 is a view illustrating a form of content attribute determination, according to the third embodiment.

FIG. 5 is a view illustrating a form of content attribute determination, according to the third embodiment.

According to an embodiment, as the VR content of 360-degree attribute is mapped to a spherical object (e.g., 20 in FIG. 3A), at least part of the horizontal straight line existing in the VR content of the 360-degree attribute may be transformed into the shape of a curve. Referring to FIG. 5, the processor (150 of FIG. 2) of the electronic device (100 of FIG. 2) may extract at least one curve C1 and/or C3 of a specified size or more, by performing image processing (e.g., edge detection filter, active contours model, or the like) on the main frame 10 of the activated content (or the output of content is commanded).

In an embodiment, the processor 150 may assign a virtual boundary line that bisects the main frame 10 in the vertical direction, to the main frame 10. The processor 150 may overlap or project a sectional surface 21 of the spherical object with or into one (e.g., the left region) of the left and right regions of the main frame 10 divided by the vertical boundary line.

In an embodiment, the processor 150 may compare the curvature of the extracted at least one curve C1 and/or C3 with the curvature of the at least part of the outline (e.g., 22) of the sectional surface 21 of the spherical object. When the attribute of content including the main frame 10 is 360 degrees, as the main frame 10 is mapped to a spherical object (e.g., 20 in FIG. 3A), the curvature of the curve C1 and/or C3 in the main frame 10 may be less than the curvature of the outline of the sectional surface 21 of the spherical object. When the number of curves having the curvature less than the outline curvature of the sectional surface 21 of the spherical object in the main frame 10 is not less than a specified quantity, the processor 150 may determine that the content including the main frame 10 is the VR content of 360-degree attribute.

Figure 6:
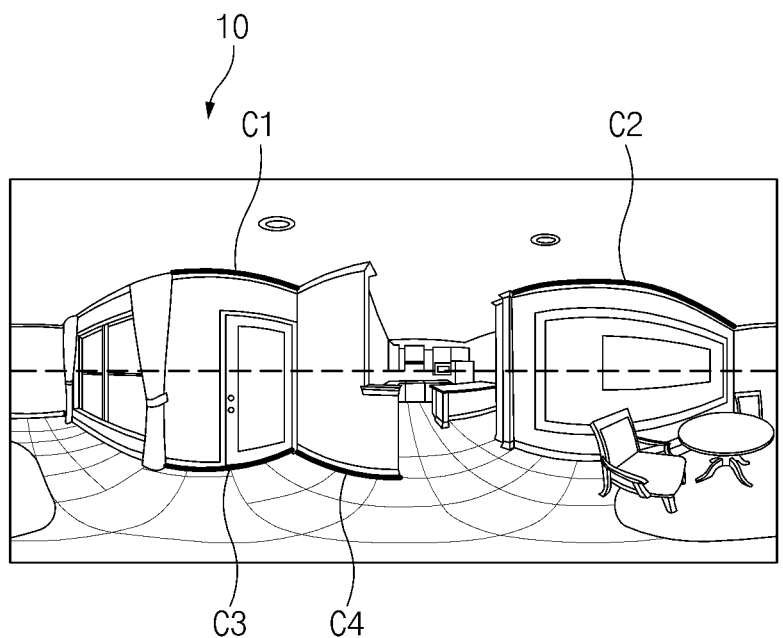
FIG. 6 is a view illustrating a form of content attribute determination, according to the fourth embodiment.

FIG. 6 is a view illustrating a form of content attribute determination, according to the fourth embodiment.

Referring to FIG. 6, in an embodiment, the processor (150 of FIG. 2) of the electronic device (100 of FIG. 2) may extract at least one curve C1, C2, C3, and/or C4 of a specified size or more existing in the main frame 10, in the same or similar manner (e.g., image processing) as described with reference to FIG. 5. The processor 150 may assign a virtual boundary line that bisects the main frame 10 in the horizontal direction, to the main frame 10.

In an embodiment, when the content including the main frame 10 has 360-degree attribute, the upper region of the main frame 10 may be mapped to the upper hemisphere of the spherical object (e.g., 20 in FIG. 3A) with respect to the horizontal boundary line and the lower region may be mapped to the lower hemisphere. As such, at least one curve existing in the upper region of the horizontal boundary line may be refracted in the upper direction with respect to the horizontal boundary line; correspondingly, the at least one curve existing in the lower region of the horizontal boundary line may be refracted in the lower direction.

In an embodiment, the processor 150 may analyze the refraction direction of each at least one curve C1, C2, C3, and/or C4 extracted from the main frame 10. The processor 150 may determine the relative location between the extracted at least one curve C1, C2, C3, and/or C4 and the horizontal boundary line dividing the main frame 10. According to an embodiment, when the number of curves refracted in the upper direction in the upper region of the horizontal boundary line is greater than the number of curves refracted in the lower direction, or when the number of curves refracted in the lower direction in the lower region of the horizontal boundary line is greater than the number of curves refracted in the upper direction, the processor 150 may determine that the content including the main frame 10 is the VR content of 360-degree attribute.

Figure 7:
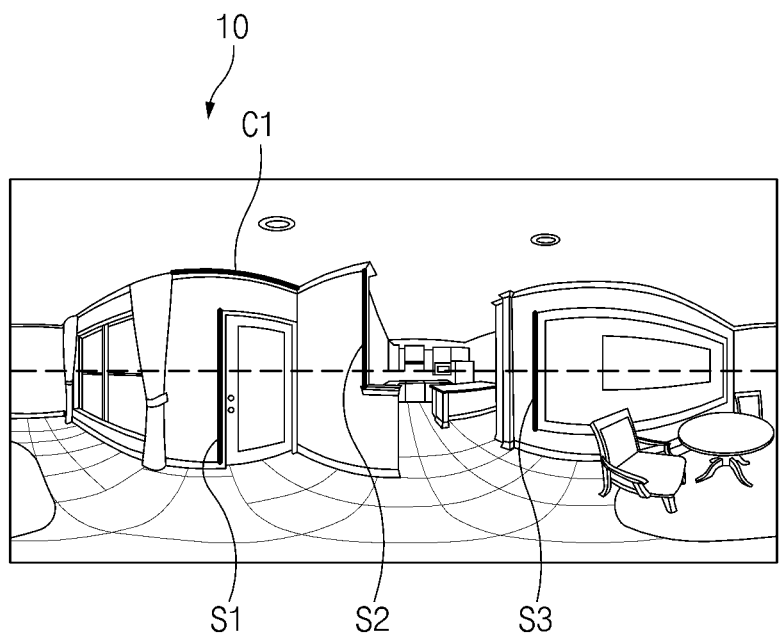
FIG. 7 is a view illustrating a form of content attribute determination, according to the fifth embodiment.

FIG. 7 is a view illustrating a form of content attribute determination, according to the fifth embodiment.

Referring to FIG. 7, at least part of at least one horizontal straight line included in the VR content of 360-degree attribute may be transformed into the shape of a curve (e.g., C1), with regard to the mapping between the VR content and a spherical object (e.g., 20 of FIG. 3A). A vertical straight line included in the VR content of 360-degree attribute may be mapped to the spherical object 20 while maintaining the original shape. In other words, as the VR content of 360-degree attribute is mapped to the spherical object 20, the horizontal straight line in the VR content of the 360-degree attribute may be transformed into a curve and the vertical straight line may not be transformed.

In an embodiment, the processor (150 of FIG. 2) of the electronic device (100 of FIG. 2) may extract at least one vertical straight line S1, S2, and/or S3 and a horizontal straight line of a specified size or more, by performing image processing (e.g., edge detection filter, active contours model, or the like) on the main frame 10 of the activated content (or the output of content is commanded). The processor 150 may calculate the number of each the extracted at least one vertical straight line S1, S2, and/or S3 and the extracted horizontal straight line. As described above, as the horizontal straight line included in the VR content of 360-degree attribute is transformed into a curve shape (e.g., C1), when the number of the vertical straight lines S1, S2, and/or S3 in the main frame 10 is greater than that of the horizontal straight lines, the processor 150 may determine that the content including the main frame 10 is the VR content of 360-degree attribute.

According to various embodiments, the processor (150 of FIG. 2) of the electronic device (100 of FIG. 2) may assign a different weight to the content attribute determination conditions according to the first to fifth embodiments described above with reference to FIGS. 3A to 7. For example, the processor 150 may assign a weight of a high level to a condition, which has the relatively high accuracy of the determination basis or the relatively high reliability of the determination result, from among the content attribute determination conditions and may assign a weight of a sequential level to other conditions. In various embodiments, the criterion for the accuracy of the determination basis or the reliability of the determination result may be set by a user or may be set, in advance, on the electronic device 100 as the operating information of a VR system.

In various embodiments, the processor 150 may perform the determination of the content attribute according to the first to fifth embodiments described above in order of the conditions to which a high weight is assigned. In this operation, for example, before the determination of the content attribute according to the first to fifth embodiments is performed completely, the sum of weights of at least one or more conditions which the activated content (or the output of content is commanded) satisfies may not be less than a specified critical value. In this case, the processor 150 excludes the determination of satisfaction of the condition of the sequence after the content attribute determination is not performed, the processor 150 may determine that the attribute of the activated content is 360 degrees.

In an embodiment, the processor 150 may identify a player matched to the attribute of the activated content, within a specified time from the attribute determination or at the same time with the attribute determination of the activated content (or the output of the content is commanded). The processor 150 may identify a specific application program (hereinafter referred to as a first application) (or an output mode (a mode in which a player matched to the attribute of VR content is executed)) including the identified player. In this operation, the processor 150 may control the display (120 of FIG. 2) to output at least one display object associated with the execution of the first application. For example, the display object is an interface provided for the user to control the execution of the first application, and may include an icon, a button, or a tap for controlling the execution of the first application.

In various embodiments, the processor 150 may output at least one of the thumbnail image or preview image of the content to be output (or played) to the at least part of the region of the display 120 through the first application (or the player included in the first application), at the same time with the output of the display object or at a specified time difference. In an embodiment, when the user applies an input to the icon, the button, or the tap included in the display object or when the user applies an input to at least one of the thumbnail image or the preview image, the processor 150 may control the execution of the first application in response to a user input. The processor 150 may process the output of the activated content based on the first application (or the player included in the first application).

Figure 8:
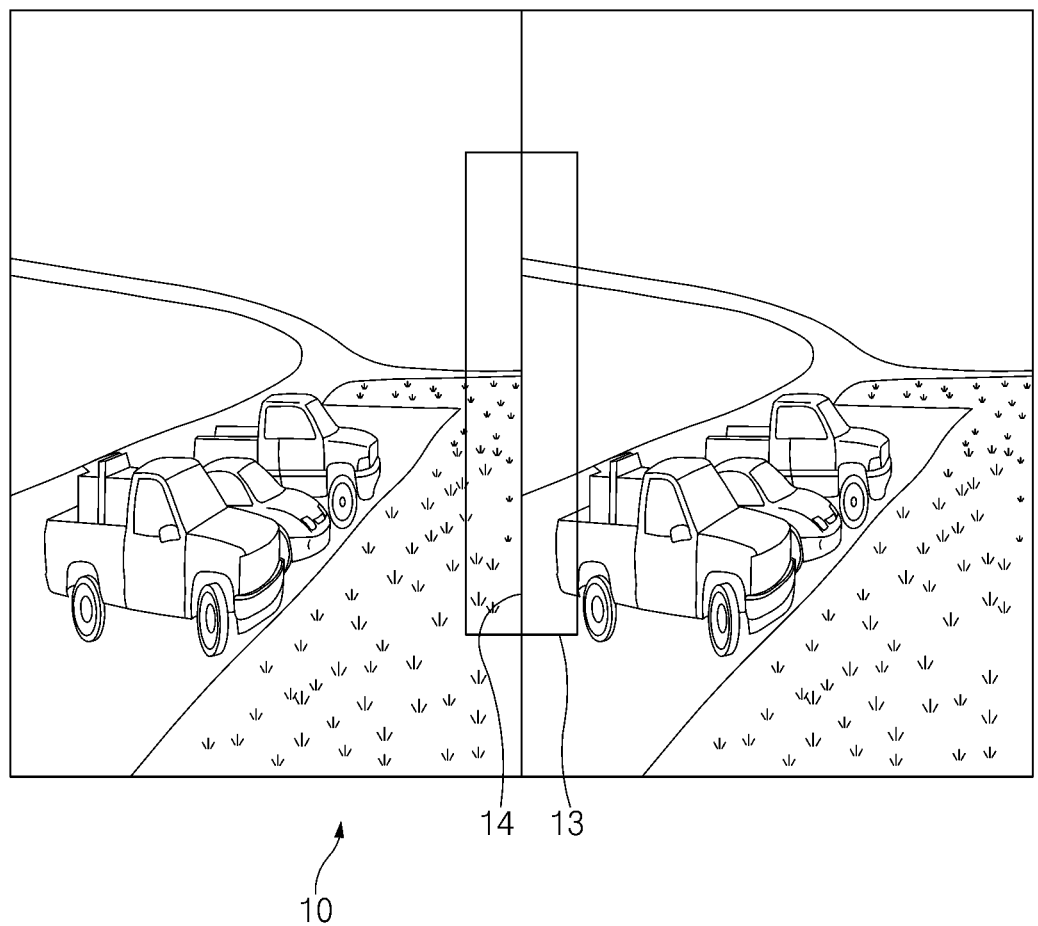
FIG. 8 is a view illustrating a form of content attribute determination, according to the sixth embodiment.

FIG. 8 is a view illustrating a form of content attribute determination, according to the sixth embodiment.

According to an embodiment, the VR content of 3D attribute may include left-eye content and right-eye content corresponding to a user's eyes with respect to the implementation of binocular parallax. As such, a boundary line for distinguishing the left-eye content and the right-eye content may be included in the VR content of the 3D attribute. In various embodiments, the boundary line may be implemented in a vertical direction (e.g., 3D SBS format) or in a horizontal direction (e.g., 3D TB format), based on the type of the 3D attribute.

Referring to FIG. 8, the processor (150 of FIG. 2) of the electronic device (100 of FIG. 2) may extract the straight line of a specified size or length or more, by performing image processing (e.g., edge detection filter, active contours model, or the like) on the main frame 10 of the activated content (or the output of content is commanded). For example, the straight line may include a vertical or horizontal straight line. When at least part of a straight line 14 of the specified size or length or more is included in a region 13 of the specified size from the center of the main frame 10, the processor 150 may determine that the content including the main frame 10 is the VR content of 3D attribute.

Figure 9:
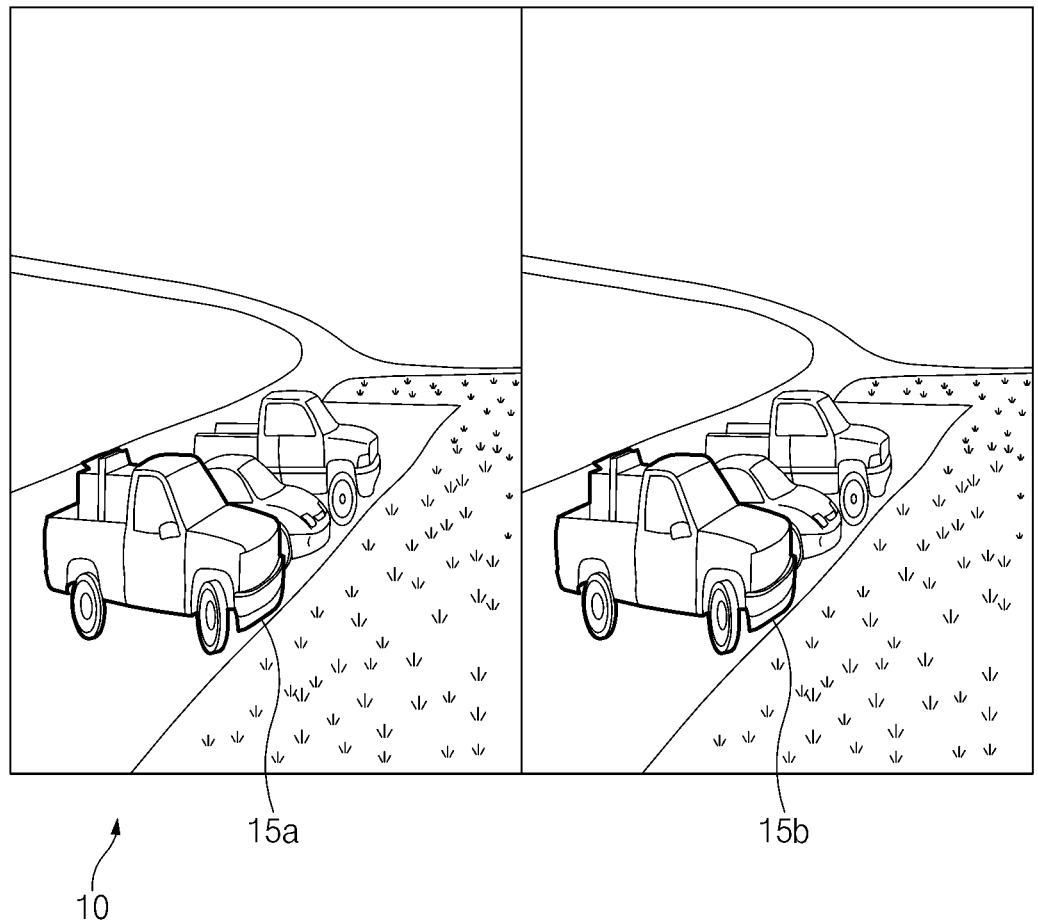
FIG. 9 is a view illustrating a form of content attribute determination, according to the seventh embodiment.
Figure 10:
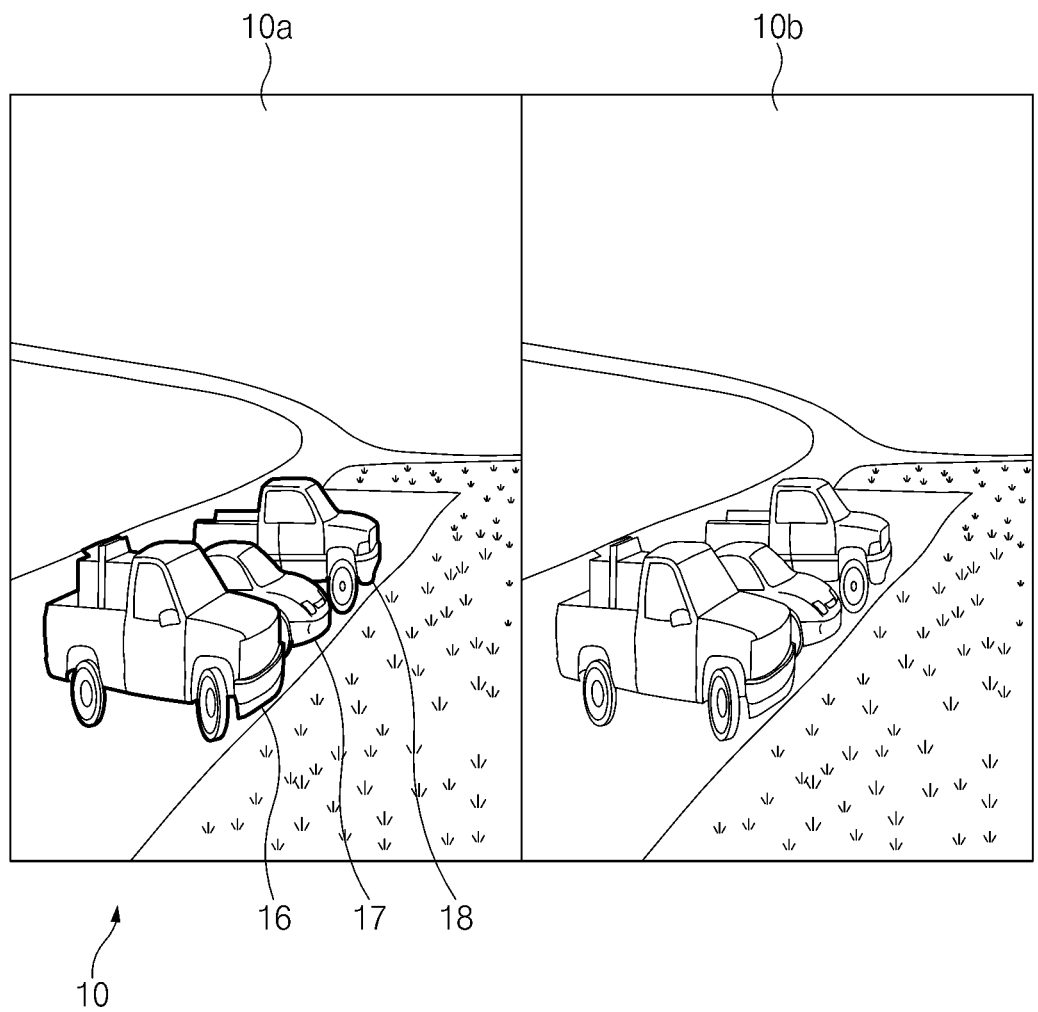
FIG. 10 is a view illustrating a form of content attribute determination, according to the eighth embodiment.

FIGS. 9 and 10 is views illustrating a form of content attribute determination, according to the seventh embodiment and the eighth embodiment, respectively.

In an embodiment, in the case of the VR content with 3D attribute, the left-eye content and the right-eye content may be similar to each other or may correspond to each other. However, at least part of factors of the VR content of 3D attribute may be different from each other between the left-eye content and the right-eye content depending on binocular parallax characteristics. For example, the first object (or object) included in each of the left-eye content and the right-eye content may have the same Y-axis coordinates but may have X coordinates different from each other.

Referring to FIG. 9, the processor (150 of FIG. 2) of the electronic device (100 of FIG. 2) may extract at least one object (or object) of a specified size or more, by performing image processing on the main frame 10 of the activated content (or the output of content is commanded). In this operation, when a plurality of objects are detected, the processor 150 may detect at least a pair of objects that are matched to each other by a specified ratio or more, by comparing the plurality of objects with each other. For example, when a pair of objects 15a and 15b that are matched to each other by a specified ratio or more are present in the main frame 10, the processor 150 may calculate the coordinates of each of the first object 15a and the second object 15b constituting the pair of objects. The processor 150 may compare the coordinates between the first object 15a and the second object 15b. In an embodiment, when the coordinates of the first object 15a and the second object 15b include the same Y axis coordinate regardless of the X axis coordinate, the processor 150 may determine that the content including the main frame 10 is the VR content of 3D attribute.

Referring to FIG. 10, the processor 150 may perform image processing on a first region 10a corresponding to half the vertical region of the main frame 10 and may calculate the number of at least one object 16, 17 and/or 18 detected in the first region 10a. As such, the processor 150 may detect the object in a second region 10b other than the first region 10a in the main frame 10 and calculate the quantity. In an embodiment, when objects, the number of which is the same as at least one object 16, 17 and/or 18 included in the first region 10a, is generated in the second region 10b, the processor 150 may determine that the content including the main frame 10 is the VR content of 3D attribute.

In various embodiments, the operations associated with the determination of the 3D attribute of the activated content (or the output of content is commanded) may be the same as or correspond to an operation of determining the 360-degree attribute of the content. For example, the processor 150 may assign a weight of a sequential level to content attribute determination conditions according to the sixth to eighth embodiments and may sequentially determine whether the content attribute determination conditions are satisfied, based on the weight. When the sum of weights of the at least one conditions satisfying the activated content is not less than the specified critical value, the processor 150 may exclude the determination of whether the content attribute determination conditions are satisfied, and may determine that the activated content is the VR content of 3D attribute.

In an embodiment, when the attribute of the activated content is 3D, the processor 150 may identify an application program (hereinafter referred to as a second application) (or an output mode (a mode in which a player matched to the attribute of VR content is executed)) including a player matched to 3D attribute. The processor 150 may output the display object, the thumbnail image, or the preview image, which is described with reference to FIG. 7, with respect to the execution control of the identified second application. When a user input is applied to the display object, the thumbnail image, or the preview image, the processor 150 may control the execution of the second application to process the output of the activated content.

According to various embodiments described above, an electronic device may include a housing, a memory storing at least a piece of content and at least one application associated with an output of the content, a display exposed through one region of the housing and displaying the content, and a processor electrically connected to the memory and the display.

According to various embodiments, the processor may be configured to determine an attribute of at least part of the content, based on whether at least one specified condition is satisfied with respect to content selected by an input and to output the selected content based on execution of an application associated with an output of the VR content when it is determined that the attribute is associated with virtual reality (VR) content.

According to various embodiments, the processor may be configured to assign a specified weight to the respective at least one condition and to determine the attribute of the selected content by comparing the sum of the weights for at least one condition that satisfies the selected content with a specified critical value.

According to various embodiments, the processor may be configured to determine that the selected content is VR content of 360-degree attribute, when a color value between a plurality of pixels included in a first region, a color value between a plurality of pixels included in a second region, and a color value between corresponding pixels in the same Y-axis coordinate between a third region and a fourth region on the selected content are the same as each other by a specified ratio or more.

According to various embodiments, the processor may be configured to determine that the selected content is VR content of 360-degree attribute, when a ratio between horizontal direction length and vertical direction length of the selected content is included in a specified ratio.

According to various embodiments, the processor may be configured to compare curvature information about a curve of a specified size or more included in the selected content with curvature information about a three-dimensional spherical object to which the selected content is mapped and to determine that the selected content is VR content of 360-degree attribute when the selected content includes a curve of curvature less than curvature of the spherical object by a specified number or more.

According to various embodiments, the processor may be configured to add a virtual boundary line, which divides the selected content in a horizontal direction, to the selected content and to determine that the selected content is VR content of 360-degree attribute, when at least one curve refracted in an upper-side direction in an upper region with respect to the boundary line is present to be more than at least one curve refracted in a lower-side direction or when at least one curve refracted in a lower-side direction in a lower region with respect to the boundary line is present to be more than at least one curve refracted in an upper-side direction.

According to various embodiments, the processor may be configured to compare the number of vertical straight lines and the number of horizontal straight lines of a specified size or more included in the selected content and to determine that the selected content is VR content of 360-degree attribute when the number of vertical straight lines is greater than the number of horizontal straight lines.

According to various embodiments, the processor may be configured to assign a region of a specified size to a center of the selected content and to determine that the selected content is VR content of 360-degree attribute when one of a horizontal straight line or a vertical straight line of a specified size or more or a specified length or more is included in the region of the specified size.

According to various embodiments, the processor may be configured to detect at least one pair of objects, which is the same as each other by a specified ratio or more, in the selected content and to determine that the selected content is VR content of 360-degree attribute when each of objects constituting the at least one pair of objects includes the same Y-axis coordinate on the selected content.

According to various embodiments, the processor may be configured to divide the selected content into a first region and a second region, which have the same area as each other and to determine that the selected content is VR content of 360-degree attribute when each of the first region and second region includes objects, the number of which is the same as each other.

According to various embodiments, the processor may be configured to output a display object capable of controlling the execution of the application associated with the attribute of the content, at a time when the attribute of the selected content is determined or within a specified time from the time when the attribute of the selected content is determined.

Figure 11:
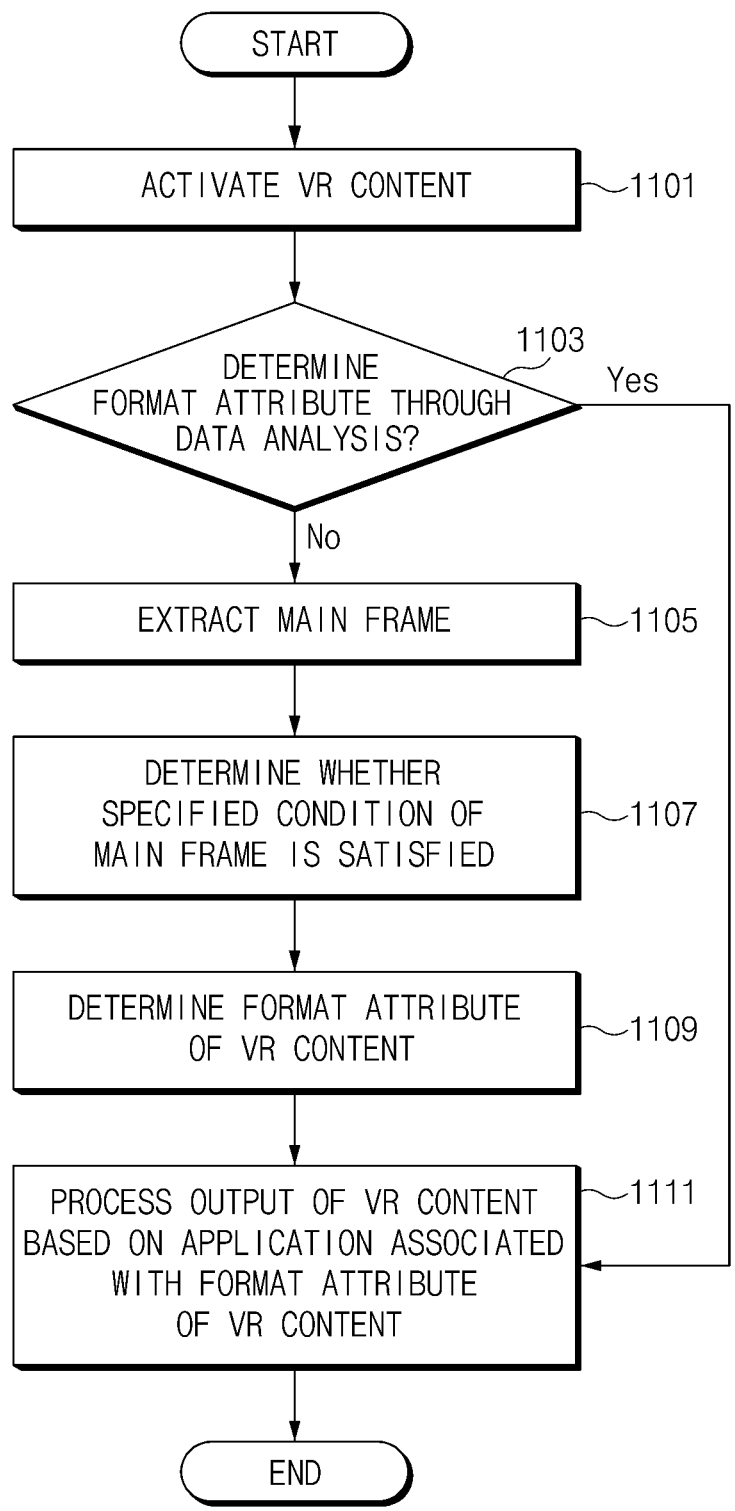
FIG. 11 is a diagram illustrating a content output method of an electronic device, according to an embodiment.

FIG. 11 is a diagram illustrating a content output method of an electronic device, according to an embodiment.

Referring to FIG. 11, in operation 1101, at least a piece of content may be selected or activated in response to a user input on an electronic device (e.g., the smartphone) (100 of FIG. 2) or an external device (e.g., the HID device (1 in FIG. 1) or the smart glasses (2 in FIG. 1)) interacting with the electronic device. The content may include at least one of video or an image.

In operation 1103, the processor (150 of FIG. 2) of the electronic device may analyze the data of the activated content. For example, the processor may analyze tag information about the activated content, URL information about the activated content, or information about the storage file name of the activated content. In an embodiment, the analysis of the tag information or the URL information may be performed when the activated content is streamed from an external device (or external server). The analysis of the information about the storage file name may be performed when the activated content is stored in the memory (110 of FIG. 2) of the electronic device. In various embodiments, the processor may store data of the analyzed content in the memory.

When the attribute (e.g., 2D, 3D side by side (SBS), 3D top and bottom (TB), 360 degrees, or the like) of the activated content is determined based on data analysis of the content in operation 1103, the processor may identify a player matched to the attribute of the activated content among at least a piece of content player stored in the memory. The processor may control the execution of the application program (or an output mode (a mode in which a player matched to the attribute of content is executed)) including the identified content player to process the output of the activated content based on the application program (or output mode).

When the data of the activated content is not present or when the attribute of the activated content is not determined based on the data in operation 1103, in operation 1105, the processor may extract the main frame of the activated content. For example, the processor may assign a frame, which includes a relatively great number of objects of a specified size or more, from among at least one frame constituting the activated content as the main frame. Alternatively, in various embodiments, the processor may assign the first frame among the at least one frame constituting the content, as the main frame. Alternatively, in various embodiments, the processor may group at least one frame constituting the content within a specified range and may select a specific group to assign at least one frame included in the specific group, as the main frame. The range of the group may be set based on the performance of content processing of the electronic device or may be set by user control.

In operation 1107, the processor may determine whether at least one specified condition is satisfied with respect to the main frame. In the first embodiment, the processor may map the main frame to a three-dimensional spherical object. In this operation, the processor may compare the color values of a plurality of pixels included in the first region in the main frame corresponding to the upper pole region on the spherical object. As such, the processor may compare the color values of a plurality of pixels included in the second region in the main frame corresponding to the lower pole region on the spherical object. Furthermore, the processor may compare the color values of pixels of the same Y-coordinate (or the same height) included in each of the third region and the fourth region in the main frame, which are in contact with each other in the arbitrary spherical surface region of the spherical object. When the color value among a plurality of pixels included in the first region are the same as the color value among a plurality of pixels included in the second region by the specified ratio or more and when the color values of the corresponding pixels in the same Y-axis coordinate (or the same height) between the third region and the fourth region are the same as each other by the specified ratio or more, the processor may determine that the main frame satisfies the content attribute determination condition according to the first embodiment.

In the second embodiment, the processor may compare the ratio between the horizontal length and the vertical length of the main frame. In an embodiment, when the ratio between the horizontal length and the vertical length is the same as a specified ratio (e.g., 2:1) or is included within a specified ratio range, the processor may determine that the main frame satisfies the content attribute determination condition according to the second embodiment.

In the third embodiment, the processor may extract at least one curve of a specified size or more included in the main frame by performing image processing (e.g., edge detection filter, active contours model, or the like), for example, on the main frame. In this operation, the processor may compare the curvature of the extracted at least one curve with the curvature of the spherical object to which the main frame is mapped. In an embodiment, when at least one curve having a curvature less than the curvature of the spherical object exists in the main frame by the specified number or more, the processor may determine that the main frame satisfies the content attribute determination condition according to the third embodiment.

In the fourth embodiment, the processor may extract at least one curve of a specified size or more from the main frame by performing image processing (e.g., edge detection filter, active contours model, or the like) on the main frame. The processor may add a virtual boundary line that bisects the main frame in the horizontal direction, to the main frame 10. The processor may determine the relative location between the extracted at least one curve and the boundary line of the horizontal direction and may analyze the refraction direction of at least one curve. In an embodiment, when there are many curves refracted in the upper direction in the upper region based on the horizontal boundary line and when there are many curves refracted in the lower direction in the lower region, the processor may determine that the main frame satisfies the content attribute determination condition according to the fourth embodiment.

In the fifth embodiment, the processor may extract a vertical straight line and a horizontal straight line of a specified size or more, by performing image processing (e.g., edge detection filter, active contours model, or the like) on the main frame. The processor may compare the number of vertical straight lines with the number of horizontal straight lines. In an embodiment, when the number of vertical straight lines is greater than the number of horizontal straight lines, the processor may determine that the main frame satisfies the content attribute determination condition according to the fifth embodiment.

In an embodiment, the processor may specify the content attribute determination conditions according to the above-described first to fifth embodiments as the first group and may assign different weights to the conditions. For example, the processor may assign a weight of a high level to a condition, which has the relatively high accuracy of the determination basis or the relatively high reliability of the determination result, from among the conditions and may assign a weight of a sequential level to other conditions. In an embodiment, the processor may perform determination of whether the conditions included in the first group are satisfied, in the order of the conditions that a high weight is allocated.

In the sixth embodiment, the processor may extract at least one of the horizontal straight line or the vertical straight line, by performing image processing (e.g., edge detection filter, active contours model, or the like) on the main frame. The processor may specify a region of a specified size at the center of the main frame and may determine whether the extracted horizontal straight line or the extracted vertical straight line is included in the specified region. In an embodiment, when at least part of the extracted horizontal straight line or the extracted vertical straight line is included in the specified region, the processor may determine that the main frame satisfies the content attribute determination condition according to the sixth embodiment.

In the seventh embodiment, the processor may extract at least one object of a specified size or more, based on image processing (e.g., edge detection filter, active contours model, or the like) on the main frame. In this operation, when a plurality of objects are detected, the processor 150 may detect at least a pair of objects that are matched to each other by a specified ratio or more, by comparing the plurality of objects with each other. The processor may calculate the coordinates on the main frame for each object constituting a pair of objects. In an embodiment, when objects constituting a pair of objects include the same Y-axis coordinate regardless of the X-axis coordinate, the processor may determine that the main frame satisfies the content attribute determination condition according to the seventh embodiment.

In the eighth embodiment, the processor may divide the main frame into the first region and the second region, which are the same as each other. The processor may extract at least one object included in each of the first region and the second region, based on image processing (e.g., edge detection filter, active contours model, or the like) on the main frame. In an embodiment, when the number of objects detected in the first region is the same as the number of objects detected in the second region, the processor may determine that the main frame satisfies the content attribute determination condition according to the eighth embodiment.

In an embodiment, the processor may specify the content attribute determination conditions according to the above-described sixth to eighth embodiments as the second group and may weigh the conditions in the second group in the manner same as or similar to the manner in which the weight is assigned to the conditions in the above-described first group. In an embodiment, the processor may perform determination of whether the conditions included in the second group are satisfied, in the order of the conditions that the high weight according to the weighting is allocated.

In operation 1109, the processor may determine the attribute of the selected or activated content in response to the user input based on whether the content attribute determination conditions according to the above-described first to eighth embodiments are satisfied.

In an embodiment, the processor may sequentially determine whether weight-based conditions are satisfied with respect to the first group and may sum the weights of the satisfied conditions. In an embodiment, when the sum of the weights is not less than a specified critical value, the processor may determine that the selected or activated content is the VR content of 360-degree attribute. In this case, the processor may exclude the determination of whether at least one or more conditions in the first group, which do not perform the determination, are satisfied.

In an embodiment, the processor may sequentially determine whether weight-based conditions are satisfied with respect to the second group and may sum the weights of the satisfied conditions. When the sum of the weights is not less than a specified critical value, the processor may determine that the content selected or activated in response to a user input is the VR content of 3D attribute.

According to various embodiments, whether the conditions included in one group of the above-described first group or the above-described second group are satisfied may be preferentially determined in response to the user control or the setting according to VR system operation information. As such, when the attribute of the content is determined by the first group or the second group, the determination of whether the conditions included in any other group are satisfied may be excluded.

According to various embodiments, the processor may exclude the configurations of the first group and the second group and may perform the content attribute determination according to the above-described first to eighth embodiments, on the selected or activated content. The processor may assign different weights to the conditions according to the first to eighth embodiments, respectively and may sequentially determine whether the conditions are satisfied, based on the weight or may determine whether the conditions are satisfied, in arbitrary order. In an embodiment, when the sum of the weights for at least one condition is not less than a specified critical value, the processor may determine that the selected or activated content is the VR content.

In operation 1111, the processor may identify a content player matched to the attribute of the selected or activated content among at least one content player stored in a memory. The processor may control the execution of an application program including the identified content player or may control the activation of an output mode for executing the identified content player to process the output of the selected or activated content.

According to various embodiments, the processor may repeatedly perform content attribute determination according to the above-described conditions on at least part of the output (or played) content. In this regard, in various embodiments, the output (or played) content may include a plurality of attributes. For example, a part of the content may include a first attribute (e.g., 360 degrees), and another part of the content may include a second attribute (e.g., 3D). In this case, the processor may process the output of the content based on the execution of an application program or an output mode, which is matched to the attribute of the initially determined content and may control the execution of application program or the output mode corresponding to the content attribute to be changed by continuously or periodically repeating content attribute determination in content output process.

According to various embodiments described above, a method of outputting content may include receiving an input to select at least a piece of content, determining an attribute of selected content based on whether at least one specified condition is satisfied, controlling execution of an application associated with an output of the VR content when it is determined that the attribute is associated with VR content, and processing an output of the selected content based on the execution of the application.

According to various embodiments, the determining of the attribute of the selected content may include determining that the selected content is VR content of 360-degree attribute when a color value between a plurality of pixels included in a first region, a color value between a plurality of pixels included in a second region, and a color value between corresponding pixels in the same Y-axis coordinate between a third region and a fourth region on the selected content are the same as each other by a specified ratio or more.

According to various embodiments, the determining of the attribute of the selected content may include determining a ratio between a horizontal direction length and a vertical direction length of the selected content and, when the ratio between the horizontal direction length and the vertical direction length is included in a specified length ratio, determining that the selected content is VR content of 360-degree attribute.

According to various embodiments, the determining of the attribute of the selected content may include comparing curvature information about a curve of a specified size or more included in the selected content with curvature information about a three-dimensional spherical object to which the selected content is mapped and, when the selected content includes a curve of curvature less than curvature of the spherical object by a specified number or more, determining that the selected content is VR content of 360-degree attribute.

According to various embodiments, the determining of the attribute of the selected content may include adding a virtual boundary line, which divides the selected content in a horizontal direction, to the selected content, determining refraction directions of curves included in an upper region and a lower region with respect to the boundary line, and when at least one curve refracted in an upper-side direction in the upper region is present to be more than at least one curve refracted in a lower-side direction or when at least one curve refracted in a lower-side direction in the lower region is present to be more than at least one curve refracted in an upper-side direction, determining that the selected content is VR content of 360-degree attribute.

According to various embodiments, the determining of the attribute of the selected content may include comparing the number of vertical straight lines and the number of horizontal straight lines of a specified size or more included in the selected content, and when the number of vertical straight lines is greater than the number of horizontal straight lines, determining that the selected content is VR content of 360-degree attribute.

According to various embodiments, the determining of the attribute of the selected content may include assigning a region of a specified size to the center of the selected content, extracting at least one of a horizontal straight line or a vertical straight line of a specified size or more or a specified length or more from the selected content, and determining that the selected content is VR content of 3D attribute when one of the horizontal straight line or the vertical straight line is included in a region of the specified size.

According to various embodiments, the determining of the attribute of the selected content may include detecting at least one pair of objects, which is the same as each other by a specified ratio or more, in the selected content and determining that the selected content is VR content of 360-degree attribute when each of objects constituting the at least one pair of objects includes the same Y-axis coordinate on the selected content.

According to various embodiments, the determining of the attribute of the selected content may include dividing the selected content into a first region and a second region, which have the same area as each other, calculating the number of objects included in each of the first region and the second region, and determining that the selected content is VR content of 360-degree attribute when each of the first region and second region includes objects, the number of which is the same as each other.

Figure 12:
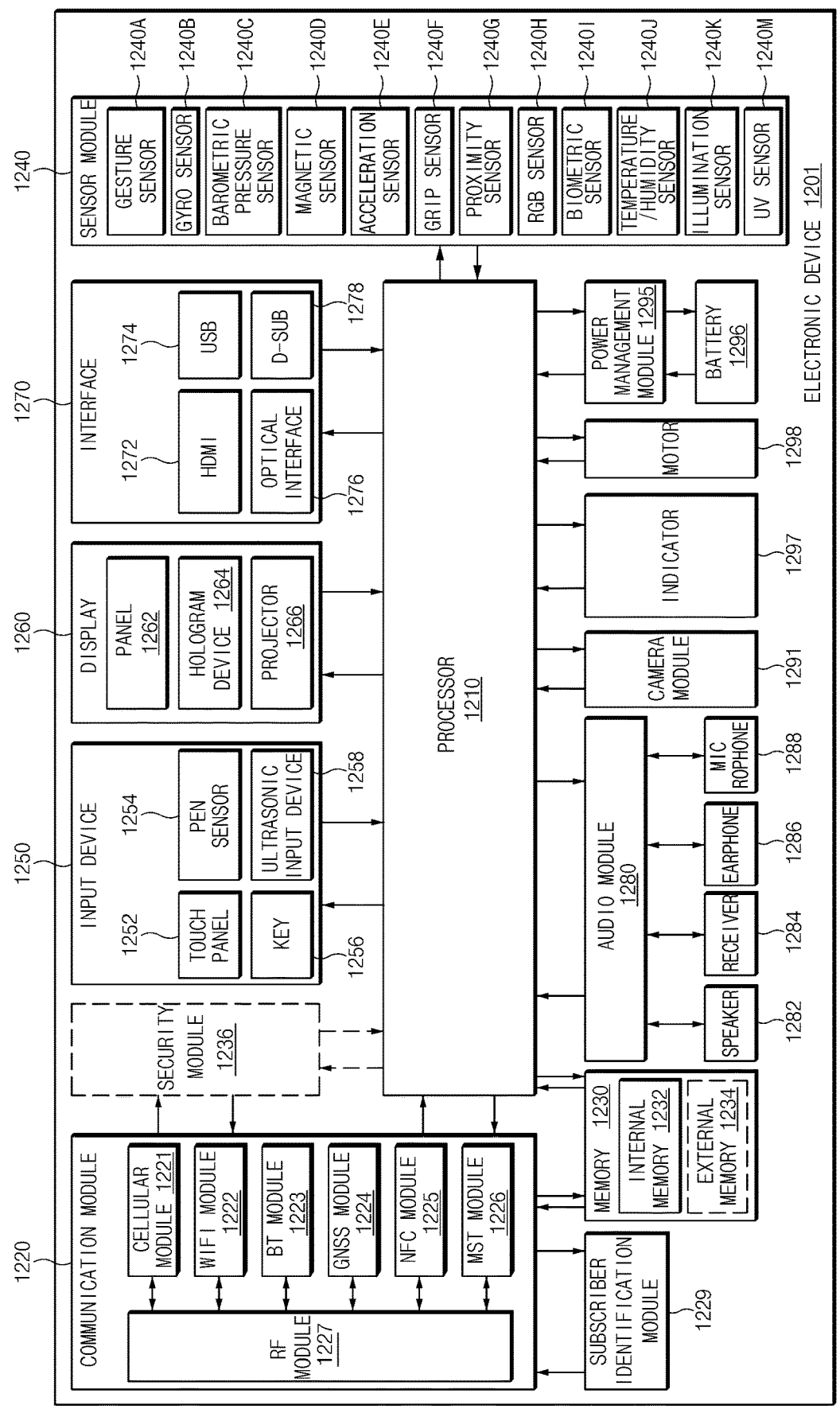
FIG. 12 is a diagram illustrating a block diagram of an electronic device, according to an embodiment.

FIG. 12 is a diagram illustrating a block diagram of an electronic device, according to an embodiment.

Referring to FIG. 12, an electronic device 1201 may include, for example, all or a part of the electronic device 100 illustrated in FIG. 2. The electronic device 1201 may include one or more processors (e.g., an application processor (AP)) 1210, a communication module 1220, a subscriber identification module 1229, a memory 1230, a sensor module 1240, an input device 1250, a display 1260, an interface 1270, an audio module 1280, a camera module 1291, a power management module 1295, a battery 1296, an indicator 1297, and a motor 1298.

The processor 1210 may drive, for example, an operating system (OS) or an application to control a plurality of hardware or software elements connected to the processor 1210 and may process and compute a variety of data. For example, the processor 1210 may be implemented with a System on Chip (SoC). According to an embodiment, the processor 1210 may further include a graphic processing unit (GPU) and/or an image signal processor. The processor 1210 may include at least a part (e.g., a cellular module 1221) of elements illustrated in FIG. 12. The processor 1210 may load an instruction or data, which is received from at least one of other elements (e.g., a nonvolatile memory), into a volatile memory and process the loaded instruction or data. The processor 1210 may store a variety of data in the nonvolatile memory.

The communication module 1220 may be configured the same as or similar to the communication interface 130 of FIG. 2. The communication module 1220 may include the cellular module 1221, a Wi-Fi module 1222, a Bluetooth (BT) module 1223, a GNSS module 1224 (e.g., a GPS module, a Glonass module, a Beidou module, or a Galileo module), a near field communication (NFC) module 1225, a MST module 1226 and a radio frequency (RF) module 1227.

The cellular module 1221 may provide, for example, voice communication, video communication, a character service, an Internet service, or the like over a communication network. According to an embodiment, the cellular module 1221 may perform discrimination and authentication of the electronic device 1201 within a communication network by using the subscriber identification module (e.g., a SIM card) 1229. According to an embodiment, the cellular module 1221 may perform at least a portion of functions that the processor 1210 provides. According to an embodiment, the cellular module 1221 may include a communication processor (CP).

Each of the Wi-Fi module 1222, the BT module 1223, the GNSS module 1224, the NFC module 1225, or the MST module 1226 may include a processor for processing data exchanged through a corresponding module, for example. According to an embodiment, at least a part (e.g., two or more) of the cellular module 1221, the Wi-Fi module 1222, the BT module 1223, the GNSS module 1224, the NFC module 1225, or the MST module 1226 may be included within one Integrated Circuit (IC) or an IC package.

For example, the RF module 1227 may transmit and receive a communication signal (e.g., an RF signal). For example, the RF module 1227 may include a transceiver, a power amplifier module (PAM), a frequency filter, a low noise amplifier (LNA), an antenna, or the like. According to another embodiment, at least one of the cellular module 1221, the Wi-Fi module 1222, the BT module 1223, the GNSS module 1224, the NFC module 1225, or the MST module 1226 may transmit and receive an RF signal through a separate RF module.

The subscriber identification module 1229 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 1230 (e.g., the memory 110 of FIG. 2) may include an internal memory 1232 or an external memory 1234. For example, the internal memory 1232 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 1234 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 1234 may be operatively and/or physically connected to the electronic device 1201 through various interfaces.

A security module 1236 may be a module that includes a storage space of which a security level is higher than that of the memory 1230 and may be a circuit that guarantees safe data storage and a protected execution environment. The security module 1236 may be implemented with a separate circuit and may include a separate processor. For example, the security module 1236 may be in a smart chip or a secure digital (SD) card, which is removable, or may include an embedded secure element (eSE) embedded in a fixed chip of the electronic device 1201. Furthermore, the security module 1236 may operate based on an operating system (OS) that is different from the OS of the electronic device 1201. For example, the security module 1236 may operate based on java card open platform (JCOP) OS.

The sensor module 1240 may measure, for example, a physical quantity or may detect an operation state of the electronic device 1201. The sensor module 1240 may convert the measured or detected information to an electric signal. For example, the sensor module 1240 may include at least one of a gesture sensor 1240A, a gyro sensor 1240B, a barometric pressure sensor 1240C, a magnetic sensor 1240D, an acceleration sensor 1240E, a grip sensor 1240F, the proximity sensor 1240G, a color sensor 1240H (e.g., red, green, blue (RGB) sensor), a biometric sensor 1240I, a temperature/humidity sensor 1240J, an illuminance sensor 1240K, or an UV sensor 1240M. Although not illustrated, additionally or generally, the sensor module 1240 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1240 may further include a control circuit for controlling at least one or more sensors included therein. According to an embodiment, the electronic device 1201 may further include a processor that is a part of the processor 1210 or independent of the processor 1210 and is configured to control the sensor module 1240. The processor may control the sensor module 1240 while the processor 1210 remains at a sleep state.

The input device 1250 may include, for example, a touch panel 1252, a (digital) pen sensor 1254, a key 1256, or an ultrasonic input unit 1258. For example, the touch panel 1252 may use at least one of capacitive, resistive, infrared and ultrasonic detecting methods. Also, the touch panel 1252 may further include a control circuit. The touch panel 1252 may further include a tactile layer to provide a tactile reaction to a user.

The (digital) pen sensor 1254 may be, for example, a part of a touch panel or may include an additional sheet for recognition. The key 1256 may include, for example, a physical button, an optical key, or a keypad. The ultrasonic input device 1258 may detect (or sense) an ultrasonic signal, which is generated from an input device, through a microphone (e.g., a microphone 1288) and may check data corresponding to the detected ultrasonic signal.

The display 1260 (e.g., the display 120 of FIG. 2) may include a panel 1262, a hologram device 1264, or a projector 1266. The panel 1262 may be the same as or similar to the display 120 illustrated in FIG. 2. The panel 1262 may be implemented, for example, to be flexible, transparent or wearable. The panel 1262 and the touch panel 1252 may be integrated into a single module. According to an embodiment, the panel 1262 may include a pressure sensor (or force sensor) that measures the intensity of touch pressure by a user. The pressure sensor may be implemented integrally with the touch panel 1252, or may be implemented as at least one sensor separately from the touch panel 1252. The hologram device 1264 may display a stereoscopic image in a space using a light interference phenomenon. The projector 1266 may project light onto a screen so as to display an image. For example, the screen may be arranged in the inside or the outside of the electronic device 1201. According to an embodiment, the display 1260 may further include a control circuit for controlling the panel 1262, the hologram device 1264, or the projector 1266.

The interface 1270 may include, for example, a high-definition multimedia interface (HDMI) 1272, a universal serial bus (USB) 1274, an optical interface 1276, or a D-subminiature (D-sub) 1278. Additionally or generally, the interface 1270 may include, for example, a mobile high definition link (MHL) interface, a SD card/multi-media card (MMC) interface, or an infrared data association (IrDA) standard interface.

The audio module 1280 may convert a sound and an electric signal in dual directions. The audio module 1280 may process, for example, sound information that is input or output through a speaker 1282, a receiver 1284, an earphone 1286, or the microphone 1288.

For example, the camera module 1291 may shoot a still image or a video. According to an embodiment, the camera module 1291 may include at least one or more image sensors (e.g., a front sensor or a rear sensor), a lens, an image signal processor (ISP), or a flash (e.g., an LED or a xenon lamp).

The power management module 1295 may manage, for example, power of the electronic device 1201. According to an embodiment, a power management integrated circuit (PMIC), a charger IC, or a battery or fuel gauge may be included in the power management module 1295. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 1296 and a voltage, current or temperature thereof while the battery is charged. The battery 1296 may include, for example, a rechargeable battery and/or a solar battery.

The indicator 1297 may display a specific state of the electronic device 1201 or a part thereof (e.g., the processor 1210), such as a booting state, a message state, a charging state, and the like. The motor 1298 may convert an electrical signal into a mechanical vibration and may generate the following effects: vibration, haptic, and the like. Although not illustrated, a processing device (e.g., a GPU) for supporting a mobile TV may be included in the electronic device 1201. The processing device for supporting the mobile TV may process media data according to the standards of digital multimedia broadcasting (DMB), digital video broadcasting (DVB), MediaFLO™, or the like.

Each of the above-mentioned elements of the electronic device according to various embodiments of the present disclosure may be configured with one or more components, and the names of the elements may be changed according to the type of the electronic device. In various embodiments, the electronic device may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

Figure 13:
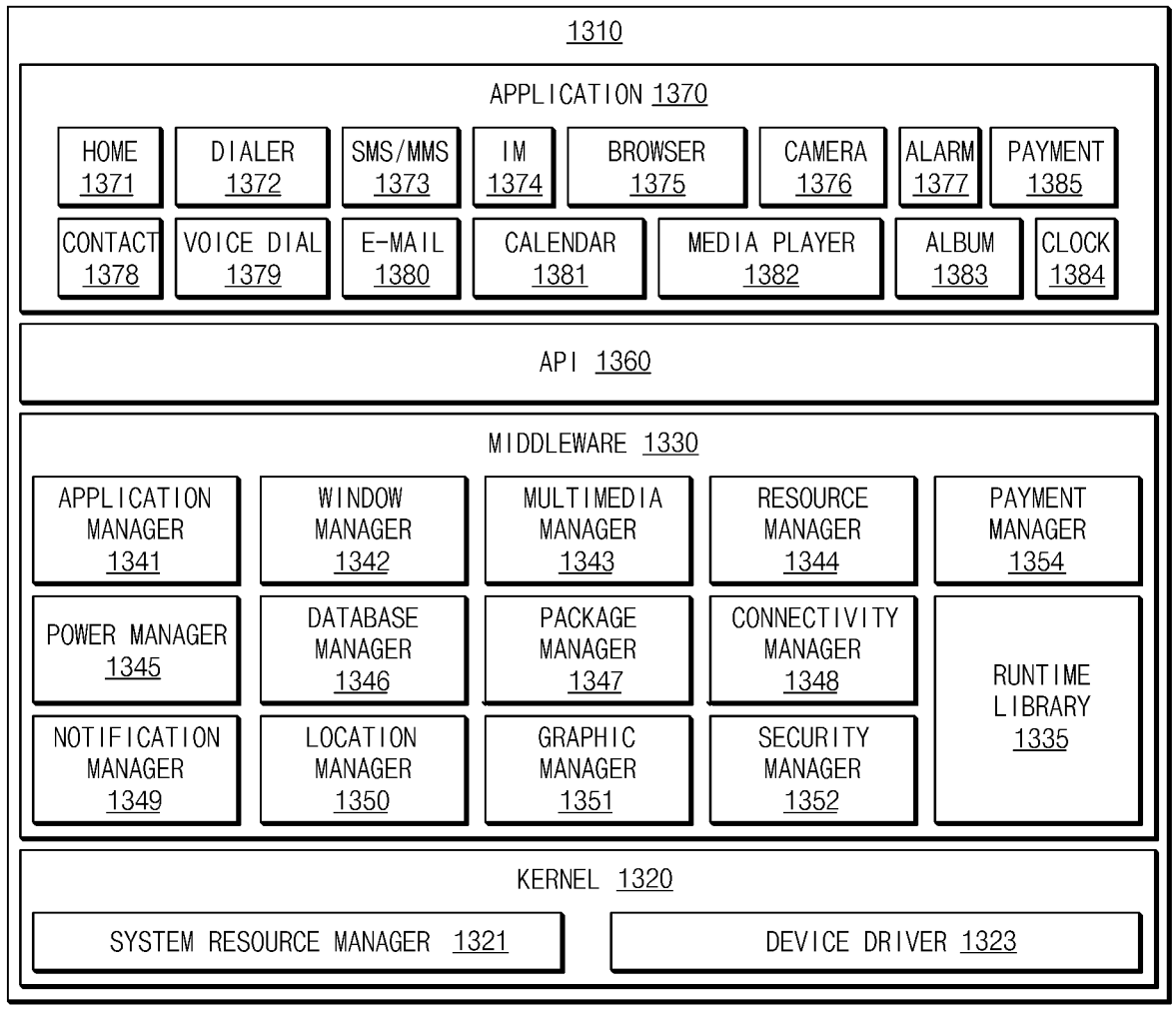
FIG. 13 is a diagram illustrating a block diagram of a program module, according to an embodiment.

FIG. 13 is a diagram illustrating a block diagram of a program module, according to an embodiment.

According to an embodiment, a program module 1310 may include an operating system (OS) to control resources associated with an electronic device (e.g., the electronic device 100 of FIG. 2), and/or diverse applications (e.g., the application program 111 of FIG. 2) driven on the OS. The OS may be, for example, Android, iOS, Windows, Symbian, or Tizen.

The program module 1310 may include a kernel 1320, a middleware 1330, an application programming interface (API) 1360, and/or an application 1370. At least a portion of the program module 1310 may be preloaded on an electronic device or may be downloadable from an external electronic device (e.g., external device 5 of FIG. 2, the server 6 of FIG. 2, or the like).

The kernel 1320 (e.g., the kernel 113 of FIG. 2) may include, for example, a system resource manager 1321 or a device driver 1323. The system resource manager 1321 may control, allocate, or retrieve system resources. According to an embodiment, the system resource manager 1321 may include a process managing unit, a memory managing unit, a file system managing unit, or the like. The device driver 1323 may include, for example, a display driver, a camera driver, a Bluetooth driver, a shared memory driver, a USB driver, a keypad driver, a Wi-Fi driver, an audio driver, or an inter-process communication (IPC) driver.

The middleware 1330 may provide, for example, a function that the application 1370 needs in common, or may provide diverse functions to the application 1370 through the API 1360 to allow the application 1370 to efficiently use limited system resources of the electronic device. According to an embodiment, the middleware 1330 (e.g., the middleware 115 of FIG. 2) may include at least one of a runtime library 1335, an application manager 1341, a window manager 1342, a multimedia manager 1343, a resource manager 1344, a power manager 1345, a database manager 1346, a package manager 1347, a connectivity manager 1348, a notification manager 1349, a location manager 1350, a graphic manager 1351, a security manager 1352, or a payment manager 1354.

The runtime library 1335 may include, for example, a library module that is used by a compiler to add a new function through a programming language while the application 1370 is being executed. The runtime library 1335 may perform input/output management, memory management, or capacities about arithmetic functions.

The application manager 1341 may manage, for example, a life cycle of at least one application of the application 1370. The window manager 1342 may manage a graphic user interface (GUI) resource that is used in a screen. The multimedia manager 1343 may identify a format necessary for playing diverse media files, and may perform encoding or decoding of media files by using a codec suitable for the format. The resource manager 1344 may manage resources such as a storage space, memory, or source code of at least one application of the application 1370.

The power manager 1345 may operate, for example, with a basic input/output system (BIOS) to manage a battery or power, and may provide power information for an operation of an electronic device. The database manager 1346 may generate, search for, or modify database that is to be used in at least one application of the application 1370. The package manager 1347 may install or update an application that is distributed in the form of package file.

The connectivity manager 1348 may manage, for example, wireless connection such as Wi-Fi or Bluetooth. The notification manager 1349 may display or notify an event such as arrival message, appointment, or proximity notification in a mode that does not disturb a user. The location manager 1350 may manage location information about an electronic device. The graphic manager 1351 may manage a graphic effect that is provided to a user, or manage a user interface relevant thereto. The security manager 1352 may provide a general security function necessary for system security, user authentication, or the like. According to an embodiment, in the case where an electronic device (e.g., the electronic device 100 of FIG. 2) includes a telephony function, the middleware 1330 may further include a telephony manager for managing a voice or video call function of the electronic device.

The middleware 1330 may include a middleware module that combines diverse functions of the above-described elements. The middleware 1330 may provide a module specialized to each OS kind to provide differentiated functions. Additionally, the middleware 1330 may dynamically remove a part of the preexisting elements or may add new elements thereto.

The API 1360 (e.g., the API 117 of FIG. 2) may be, for example, a set of programming functions and may be provided with a configuration that is variable depending on an OS. For example, in the case where an OS is the android or the iOS, it may provide one API set per platform. In the case where an OS is the tizen, it may provide two or more API sets per platform.

The application 1370 (e.g., the application program 111 of FIG. 2) may include, for example, one or more applications capable of providing functions for a home 1371, a dialer 1372, an SMS/MMS 1373, an instant message (IM) 1374, a browser 1375, a camera 1376, an alarm 1377, a contact 1378, a voice dial 1379, an e-mail 1380, a calendar 1381, a media player 1382, an album 1383, a timepiece 1384, a payment 1385, health care (e.g., measuring an exercise quantity, blood sugar, or the like) or offering of environment information (e.g., information of barometric pressure, humidity, temperature, or the like).

According to an embodiment, the application 1370 may include an application (hereinafter referred to as "information exchanging application" for descriptive convenience) to support information exchange between an electronic device (e.g., the electronic device 100 of FIG. 2) and an external electronic device. The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device. Additionally, the notification relay application may receive, for example, notification information from an external electronic device and provide the notification information to a user.

The device management application may manage (e.g., install, delete, or update), for example, at least one function (e.g., turn-on/turn-off of an external electronic device itself (or a part of components) or adjustment of brightness (or resolution) of a display) of the external electronic device which communicates with the electronic device, an application running in the external electronic device, or a service (e.g., a call service, a message service, or the like) provided from the external electronic device.

According to an embodiment, the application 1370 may include an application (e.g., a health care application of a mobile medical device) that is assigned in accordance with an attribute of an external electronic device. According to an embodiment, the application 1370 may include an application that is received from an external electronic device. According to an embodiment, the application 1370 may include a preloaded application or a third party application that is downloadable from a server. The names of elements of the program module 1310 according to the embodiment may be modifiable depending on kinds of operating systems.

According to various embodiments, at least a portion of the program module 1310 may be implemented by software, firmware, hardware, or a combination of two or more thereof. At least a portion of the program module 1310 may be implemented (e.g., executed), for example, by the processor (e.g., the processor 1210). At least a portion of the program module 1310 may include, for example, modules, programs, routines, sets of instructions, processes, or the like for performing one or more functions.

The term "module" used in this disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in computer-readable storage media in the form of a program module. The instruction, when executed by a processor (e.g., the processor 150 of FIG. 2), may cause the one or more processors to perform a function corresponding to the instruction. The computer-readable storage media, for example, may be the memory (e.g., the memory 110 of FIG. 2).

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation of various embodiments of the present disclosure, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. An electronic device comprising:
a housing;
a memory configured to store at least a piece of content and at least one application associated with an output of the content;
a display exposed through one region of the housing and configured to display the content; and
a processor electrically connected to the memory and the display,
wherein the processor is configured to:

determine an attribute of at least part of the content, based on whether at least one specified condition determining whether content selected by an input from the at least part of the content is mapped to a three-dimensional object or whether the selected content includes left-eye content and right-eye content is satisfied; and when it is determined that the attribute is associated with virtual reality (VR) content, output the selected content based on execution of an application of the at least one application associated with an output of the VR content of the attribute, wherein the processor is further configured to:

add a virtual boundary line, which divides the selected content in a horizontal direction, to the selected content; and when at least one curve refracted in an upper-side direction in an upper region with respect to the boundary line is present to be more than at least one curve refracted in a lower-side direction or when at least one curve refracted in the lower-side direction in a lower region with respect to the boundary line is present to be more than at least one curve refracted in the upper-side direction, determine that the selected content is the VR content of 360-degree attribute.

2. The electronic device of claim 1, wherein the processor is configured to:

when color values of pixels included in a first region on the selected content are the same as each other by a specified ratio or more, color values of pixels included in a second region on the selected content are the same as each other by the specified ratio or more, and color values of corresponding pixels in the same Y-axis coordinate in a third region and a fourth region on the selected content are the same as each other by the specified ratio or more, determine that the selected content is the VR content of the 360-degree attribute.

3. The electronic device of claim 1, wherein the processor is configured to:

when a ratio between horizontal direction length and vertical direction length of the selected content is included in a specified ratio, determine that the selected content is the VR content of the 360-degree attribute.

4. The electronic device of claim 1, wherein the processor is configured to:

compare curvature information about a curve of a specified size or more included in the selected content with curvature information about a three-dimensional spherical object to which the selected content is mapped; and when the selected content includes a curve of curvature less than curvature of the spherical object by a specified number or more, determine that the selected content is the VR content of the 360-degree attribute.

5. The electronic device of claim 1, wherein the processor is configured to:

compare the number of vertical straight lines and the number of horizontal straight lines of a specified size or more included in the selected content; and when the number of vertical straight lines is greater than the number of horizontal straight lines, determine that the selected content is the VR content of the 360-degree attribute.

6. The electronic device of claim 1, wherein the processor is configured to:

assign a region of a specified size to a center of the selected content; and when one of a horizontal straight line or a vertical straight line of a specified length or more is included in the region of the specified size, determine that the selected content is the VR content of the 360-degree attribute.

7. The electronic device of claim 1, wherein the processor is configured to:

detect at least one pair of objects, which is the same as each other by a specified ratio or more, in the selected content; and when each of objects constituting the at least one pair of objects includes the same Y-axis coordinate on the selected content, determine that the selected content is the VR content of the 360-degree attribute.

8. The electronic device of claim 1, wherein the processor is configured to:

divide the selected content into a first region and a second region, which have the same area as each other; and when each of the first region and second region includes objects, the number of which is the same as each other, determine that the selected content is the VR content of the 360-degree attribute.

9. A method of outputting content, the method comprising:

receiving an input to select at least a piece of content;

determining an attribute of the selected content based on whether at least one specified condition determining whether the selected content is mapped to a three-dimensional object or whether the selected content includes left-eye content and right-eye content is satisfied;

when it is determined that the attribute is associated with VR content, controlling execution of an application associated with an output of the VR content of the attribute; and processing an output of the selected content based on the execution of the application, wherein the determining of the attribute of the selected content includes:

adding a virtual boundary line, which divides the selected content in a horizontal direction, to the selected content;

determining refraction directions of curves included in an upper region and a lower region with respect to the boundary line; and when at least one curve refracted in an upper-side direction in the upper region is present to be more than at least one curve refracted in a lower-side direction or when at least one curve refracted in the lower-side direction in the lower region is present to be more than at least one curve refracted in the upper-side direction, determining that the selected content is the VR content of the 360-degree attribute.

10. The method of claim 9, wherein the determining of the attribute of the selected content includes:

when color values of pixels included in a first region on the selected content are the same as each other by a specified ratio or more, color values of pixels included in a second region on the selected content are the same as each other by the specified ratio or more, and color values of corresponding pixels in the same Y-axis coordinate in a third region and a fourth region on the selected content are the same as each other by the specified ratio or more, determining that the selected content is the VR content of the 360-degree attribute.

11. The method of claim 9, wherein the determining of the attribute of the selected content includes:

determining a ratio between a horizontal direction length and a vertical direction length of the selected content; and when the ratio between the horizontal direction length and the vertical direction length is included in a specified length ratio, determining that the selected content is the VR content of the 360-degree attribute.

12. The method of claim 9, wherein the determining of the attribute of the selected content includes:

comparing curvature information about a curve of a specified size or more included in the selected content with curvature information about a three-dimensional spherical object to which the selected content is mapped; and when the selected content includes a curve of curvature less than curvature of the spherical object by a specified number or more, determining that the selected content is the VR content of the 360-degree attribute.

13. The method of claim 9, wherein the determining of the attribute of the selected content includes:

comparing the number of vertical straight lines and the number of horizontal straight lines of a specified size or more included in the selected content; and when the number of vertical straight lines is greater than the number of horizontal straight lines, determining that the selected content is the VR content of the 360-degree attribute.

* * * * *